(12) United States Patent
Ramasamy et al.

(10) Patent No.: US 11,385,883 B2
(45) Date of Patent: Jul. 12, 2022

(54) METHODS AND SYSTEMS THAT CARRY OUT LIVE MIGRATION OF MULTI-NODE APPLICATIONS

(71) Applicant: VMware, Inc., Palo Alto, CA (US)

(72) Inventors: Karthikeyan Ramasamy, Bangalore (IN); Darshan Digikar, Bangalore (IN); Jasmine Ejner, Bangalore (IN); Vikranth Ravi Shetty, Bangalore (IN); Ramachandran Thirupathi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 549 days.

(21) Appl. No.: 15/880,120

(22) Filed: Jan. 25, 2018

(65) Prior Publication Data

US 2019/0227781 A1 Jul. 25, 2019

(51) Int. Cl.

| | |
|---|---|
| *G06F 8/65* | (2018.01) |
| *G06F 8/61* | (2018.01) |
| *H04L 67/00* | (2022.01) |
| *H04L 67/1097* | (2022.01) |
| *G06F 9/445* | (2018.01) |
| *G06F 16/27* | (2019.01) |
| *H04L 41/00* | (2022.01) |
| *H04L 67/10* | (2022.01) |
| *G06F 8/656* | (2018.01) |
| *G06F 9/455* | (2018.01) |

(52) U.S. Cl.
CPC .............. *G06F 8/65* (2013.01); *G06F 8/62* (2013.01); *G06F 8/656* (2018.02); *G06F 9/44505* (2013.01); *G06F 16/275* (2019.01); *H04L 41/00* (2013.01); *H04L 67/10* (2013.01); *H04L 67/1097* (2013.01); *H04L 67/34* (2013.01); *G06F 9/45533* (2013.01)

(58) Field of Classification Search
None
See application file for complete search history.

(56) References Cited

U.S. PATENT DOCUMENTS

| | | | | |
|---|---|---|---|---|
| 5,537,533 A | * | 7/1996 | Staheli | G06F 11/2071 714/20 |
| 7,555,751 B1 | * | 6/2009 | Abbavaram | G06F 8/656 717/168 |
| 7,844,686 B1 | * | 11/2010 | Keith, Jr. | G06F 11/1662 709/219 |

(Continued)

*Primary Examiner* — Qing Chen

(57) ABSTRACT

The current document is directed to methods and systems that carry out live migration of multi-node applications in distributed-computing systems, including cloud-computing applications in cloud-computing facilities. The disclosed methods and systems employ an installer/agent and a data-transformation component to install new versions of a multi-node application within a distributed computing system and to then warm start each application-provided service within the newly installed new-version application nodes. Following a data sync operation, each warm-started application service is brought online to service subsequently received service requests as older-version corresponding services of current application nodes complete request services and terminate, providing live migration from an older version multi-node application to a new-version multi-node application without service-provision interruption.

19 Claims, 24 Drawing Sheets

(56) References Cited

U.S. PATENT DOCUMENTS

| | | | | |
|---|---|---|---|---|
| 8,806,480 B2* | 8/2014 | Araujo, Jr | ............... | G06F 9/54 |
| | | | | 718/1 |
| 8,910,160 B1* | 12/2014 | Patwardhan | ........ | G06F 9/45558 |
| | | | | 718/1 |
| 9,092,397 B1* | 7/2015 | Kurtz | ................ | G06F 11/2028 |
| 9,176,720 B1* | 11/2015 | Day-Richter | ............ | G06F 8/63 |
| 9,444,718 B2* | 9/2016 | Khakpour | ............... | H04L 43/50 |
| 9,841,988 B1* | 12/2017 | Magnezi | ............ | G06F 9/45558 |
| 9,960,963 B2* | 5/2018 | Selvaraj | ............... | H04L 41/082 |
| 2012/0017031 A1* | 1/2012 | Mashtizadeh | ....... | G06F 9/45558 |
| | | | | 711/6 |
| 2012/0266156 A1* | 10/2012 | Spivak | ................ | H04L 47/70 |
| | | | | 717/172 |
| 2014/0215172 A1* | 7/2014 | Tsirkin | ................ | G06F 11/203 |
| | | | | 711/162 |
| 2014/0215459 A1* | 7/2014 | Tsirkin | ............... | G06F 9/45558 |
| | | | | 718/1 |
| 2015/0113152 A1* | 4/2015 | Sreeramoju | ........... | H04L 69/163 |
| | | | | 709/228 |
| 2015/0263894 A1* | 9/2015 | Kasturi | ................ | G06F 9/4856 |
| | | | | 709/222 |
| 2016/0170978 A1* | 6/2016 | Michael | ................ | G06F 16/214 |
| | | | | 707/609 |
| 2017/0139637 A1* | 5/2017 | Roozbeh | ................ | G06F 3/067 |
| 2018/0349166 A1* | 12/2018 | Movsisyan | ........... | G06F 9/5088 |

* cited by examiner

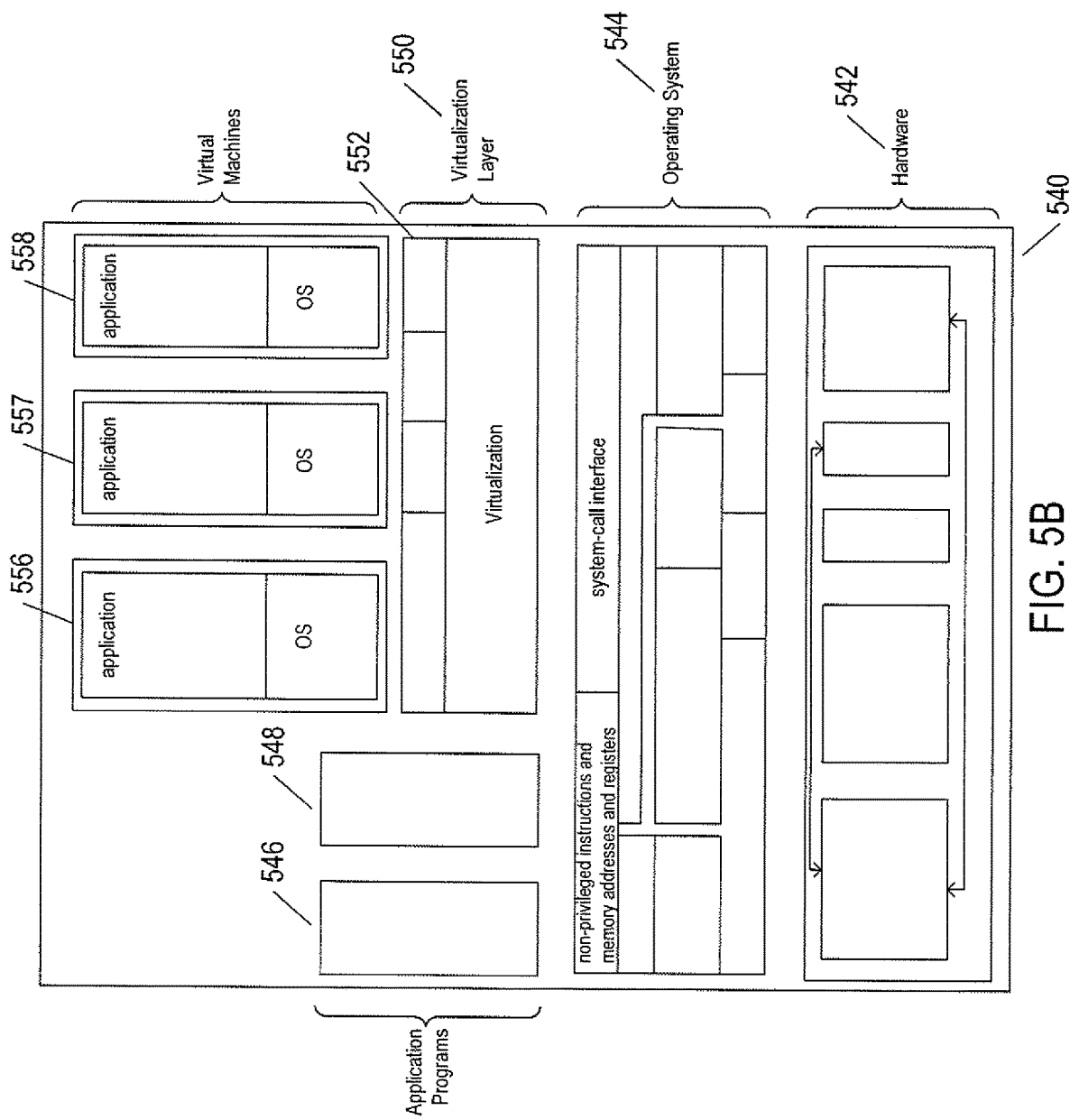

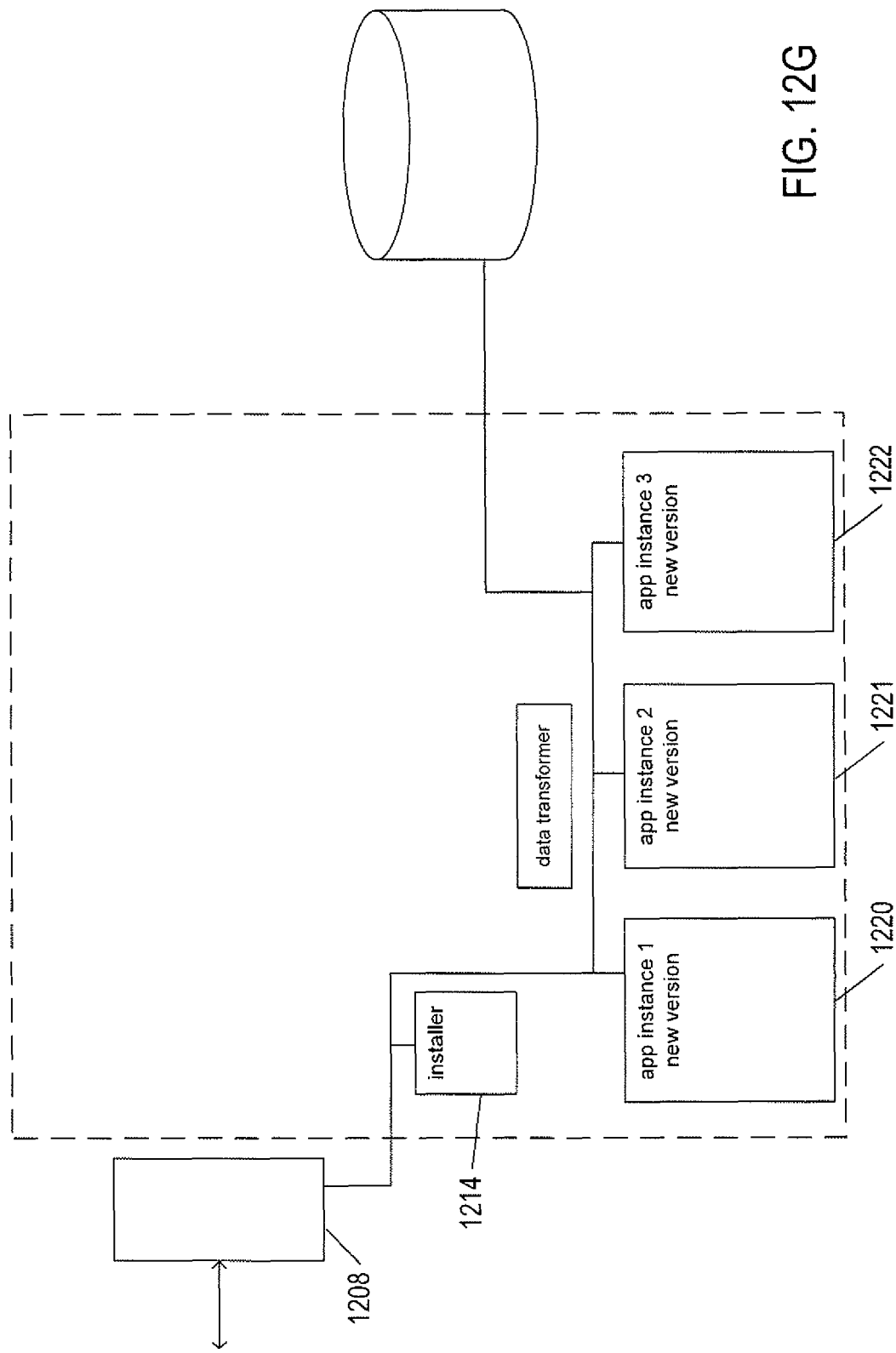

METHODS AND SYSTEMS THAT CARRY OUT LIVE MIGRATION OF MULTI-NODE APPLICATIONS

TECHNICAL FIELD

The current document is directed to distributed-computing systems and, in particular, to methods and systems that carry out live migration of multi-node applications in distributed-computing systems, including cloud-computing facilities.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system management and administration. Currently, these needs have begun to be addressed by highly capable automated management and administration tools and facilities. As with many other types of computational systems and facilities, from operating systems to applications, many different types of automated administration and management facilities have emerged, providing many different products with overlapping functionalities, but each also providing unique functionalities and capabilities. Owners, managers, and users of large-scale computer systems continue to seek methods and technologies to provide efficient and cost-effective management, administration, and development of applications within cloud-computing facilities and other large-scale computer systems.

SUMMARY

The current document is directed to methods and systems that carry out live migration of multi-node applications in distributed-computing systems, including cloud-computing applications in cloud-computing facilities. The disclosed methods and systems employ an installer/agent and a data-transformation component to install new versions of a multi-node application within a distributed computing system and to then warm start each application-provided service within the newly installed new-version application nodes. Following a data sync operation, each warm-started application service is brought online to service subsequently received service requests as older-version corresponding services of current application nodes complete request services and terminate, providing live migration from an older version multi-node application to a new-version multi-node application without service-provision interruption.

BRIEF DESCRIPTION OF THE DRAWINGS

FIGS. 5A-B illustrate two types of virtual machine and virtual-machine execution environments.

FIG. 12A-G provides an architectural diagram of the workflow-execution engine and development environment.

DETAILED DESCRIPTION

Figure 1:
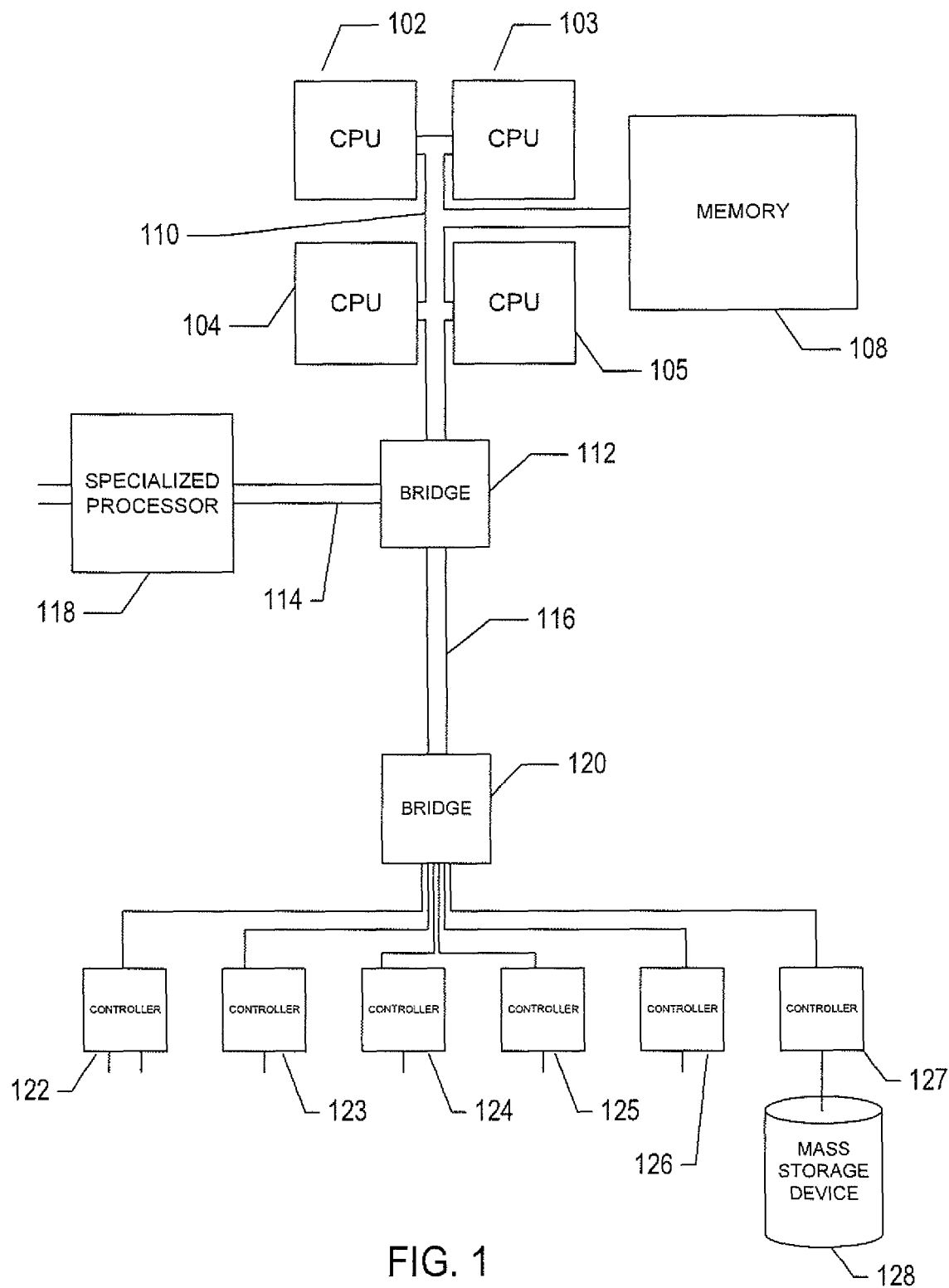
FIG. 1 provides a general architectural diagram for various types of computers.

The current document is directed to methods and systems that carry out live migration of multi-node applications in distributed-computing systems, including cloud-computing applications in cloud-computing facilities. In a first subsection, below, a detailed description of computer hardware, complex computational systems, and virtualization is provided with reference to FIGS. 1-10. A second subsection discusses the methods and systems to which the current document is directed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software-implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
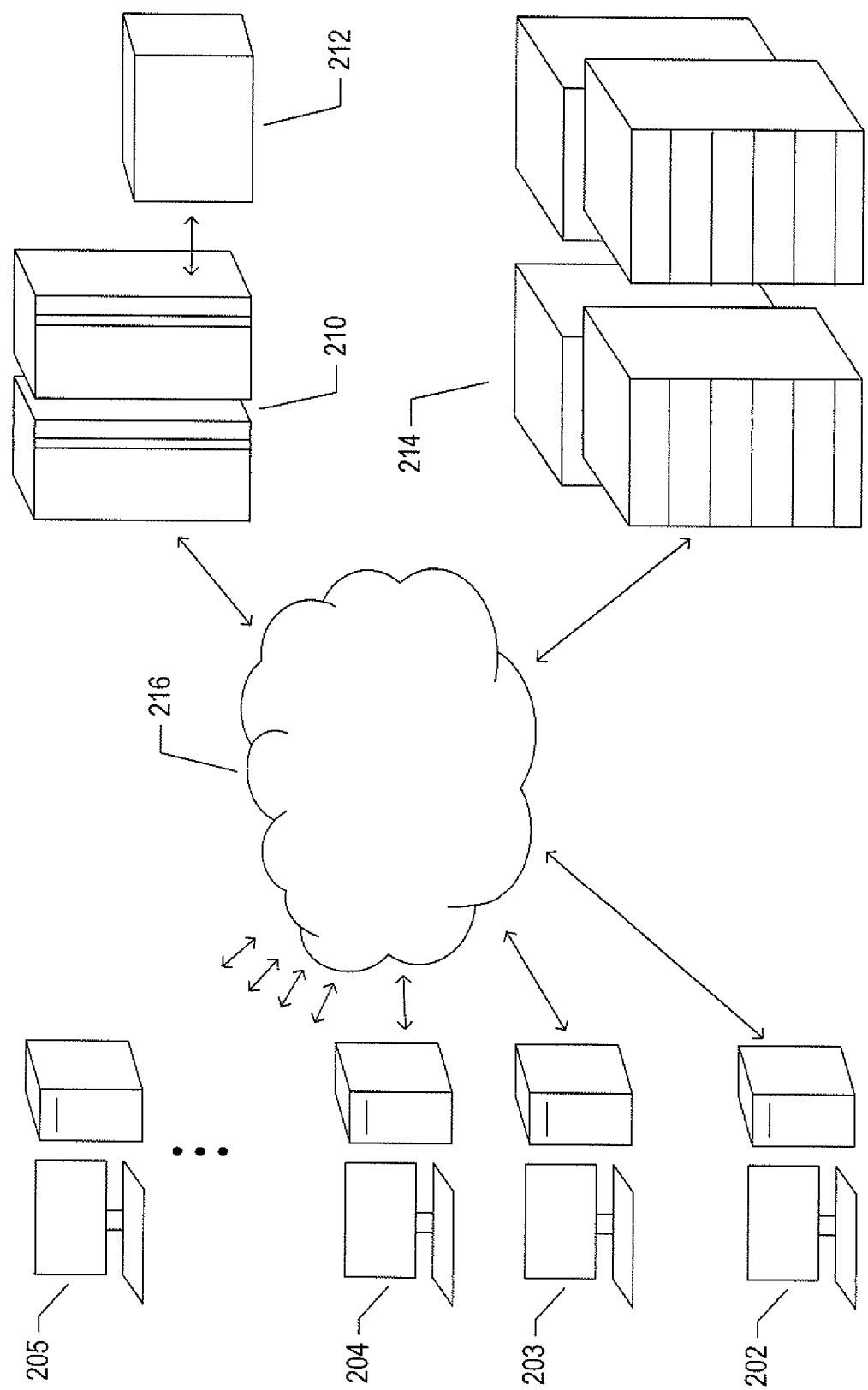
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
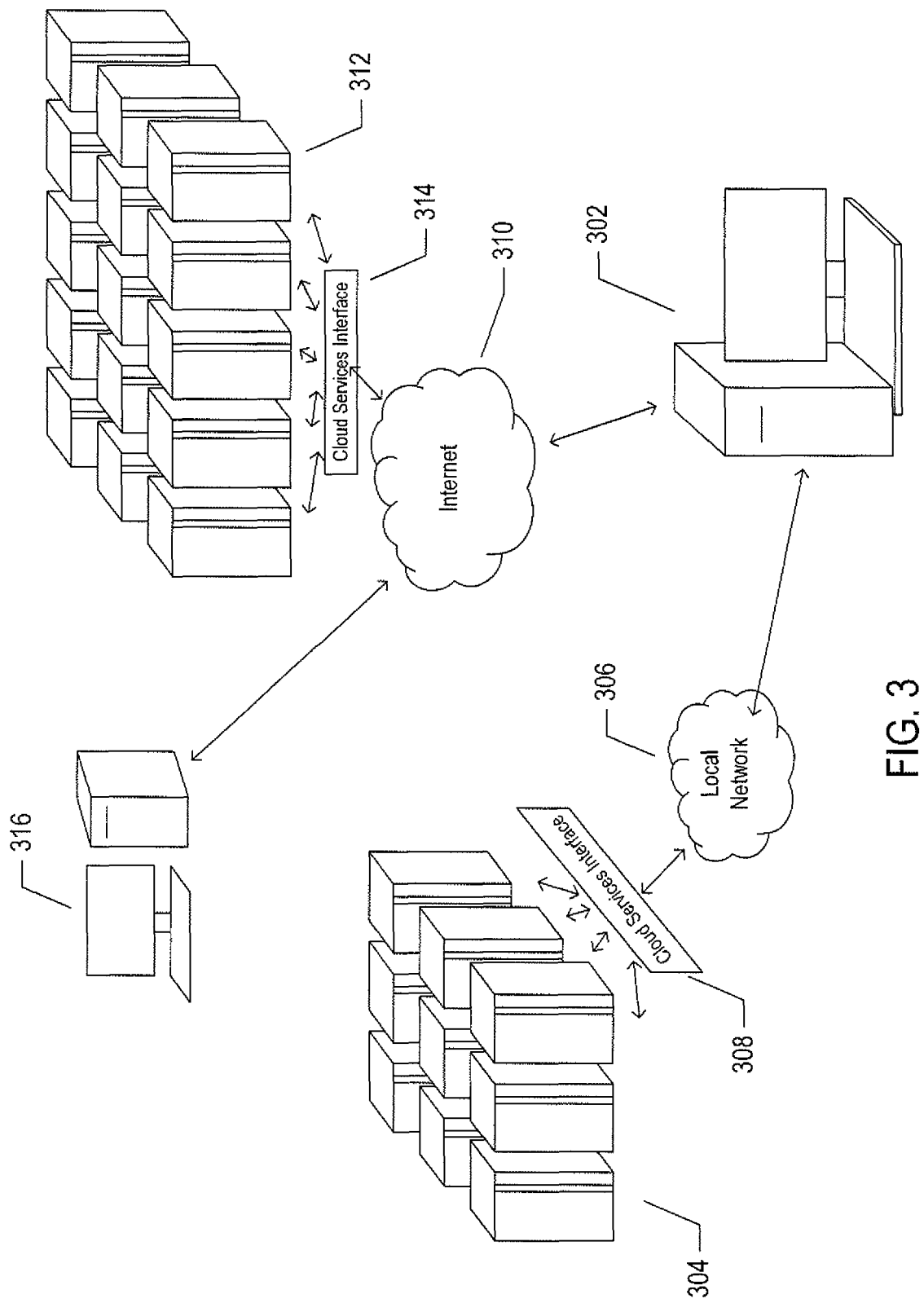
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
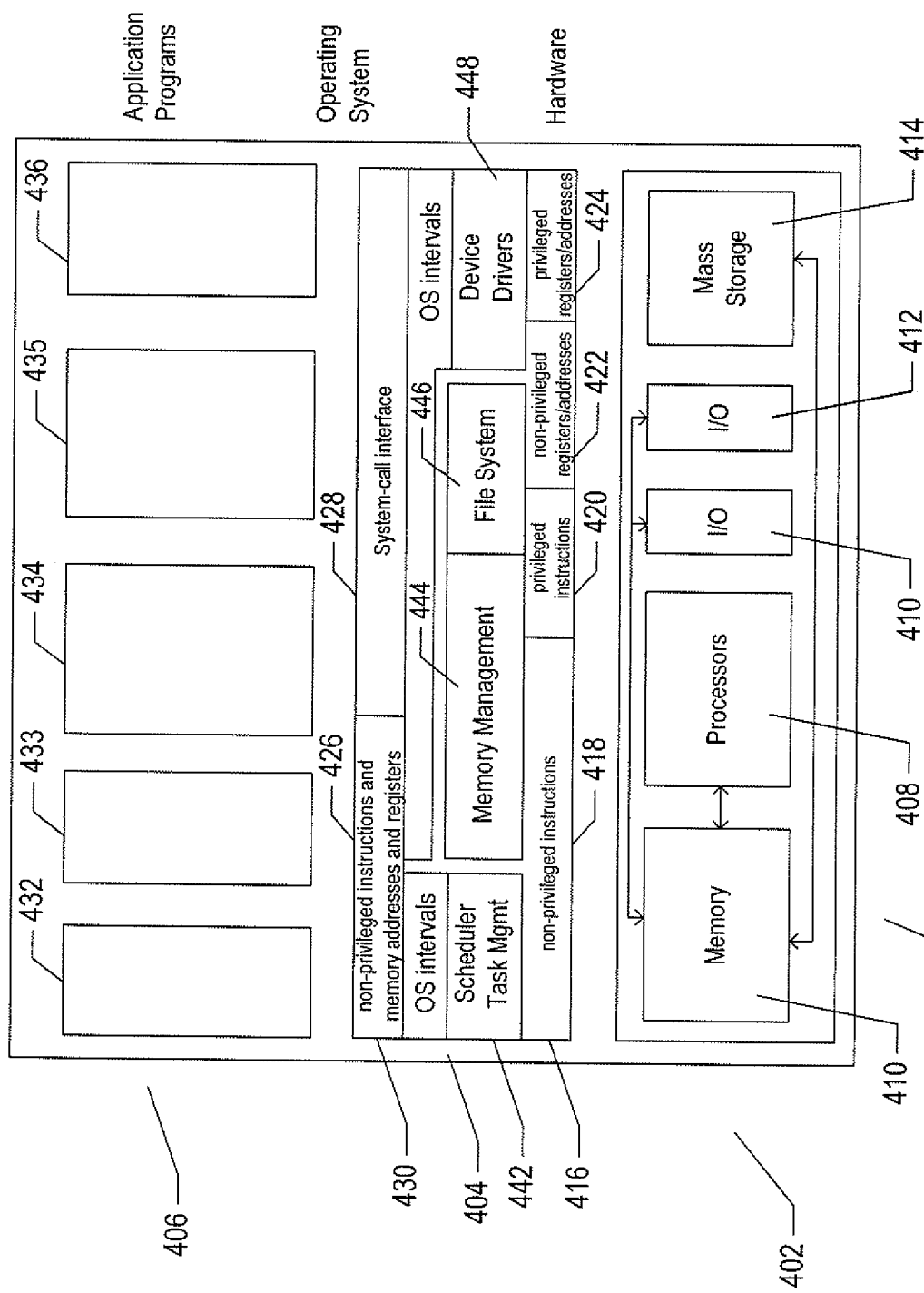
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
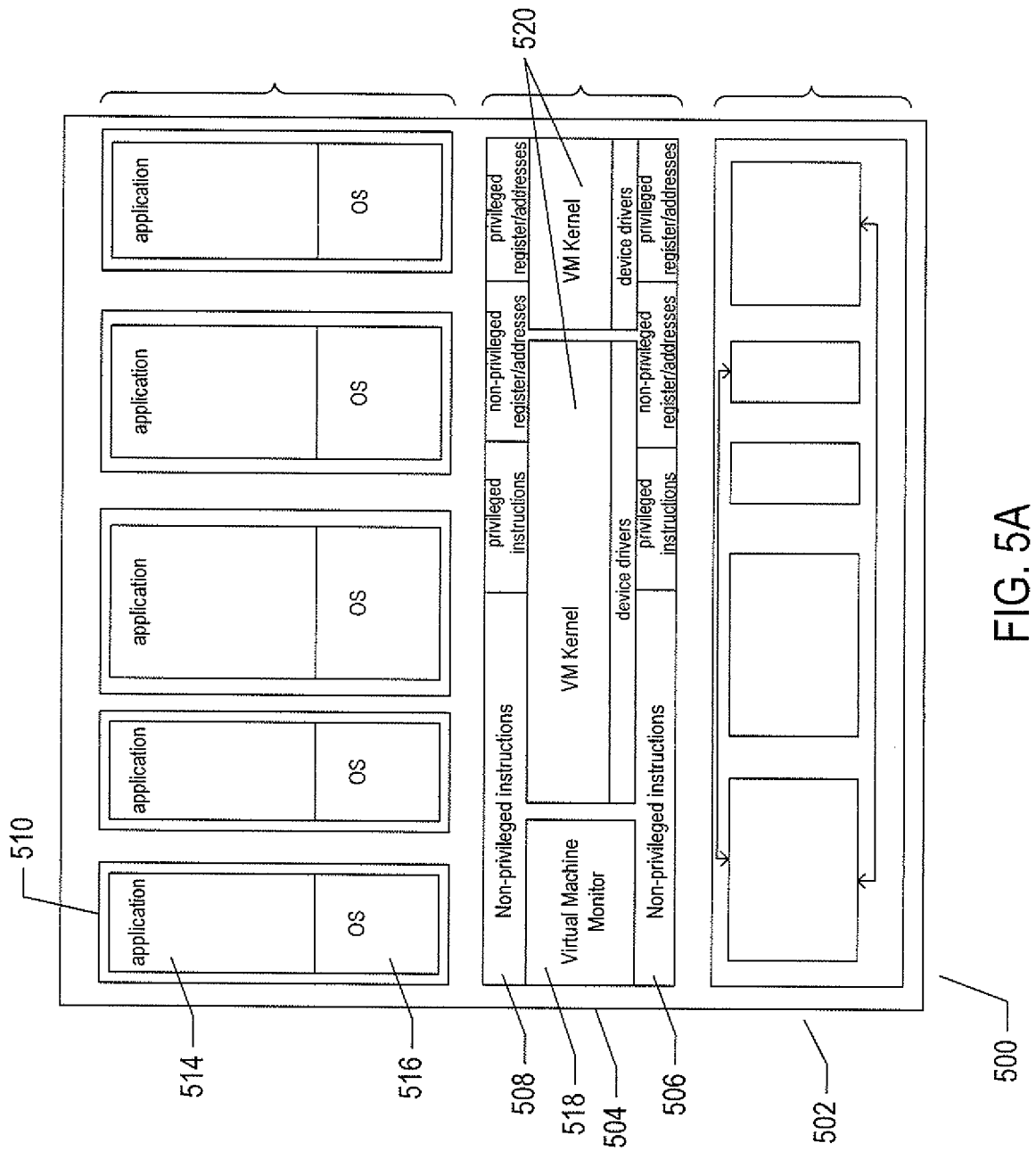

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
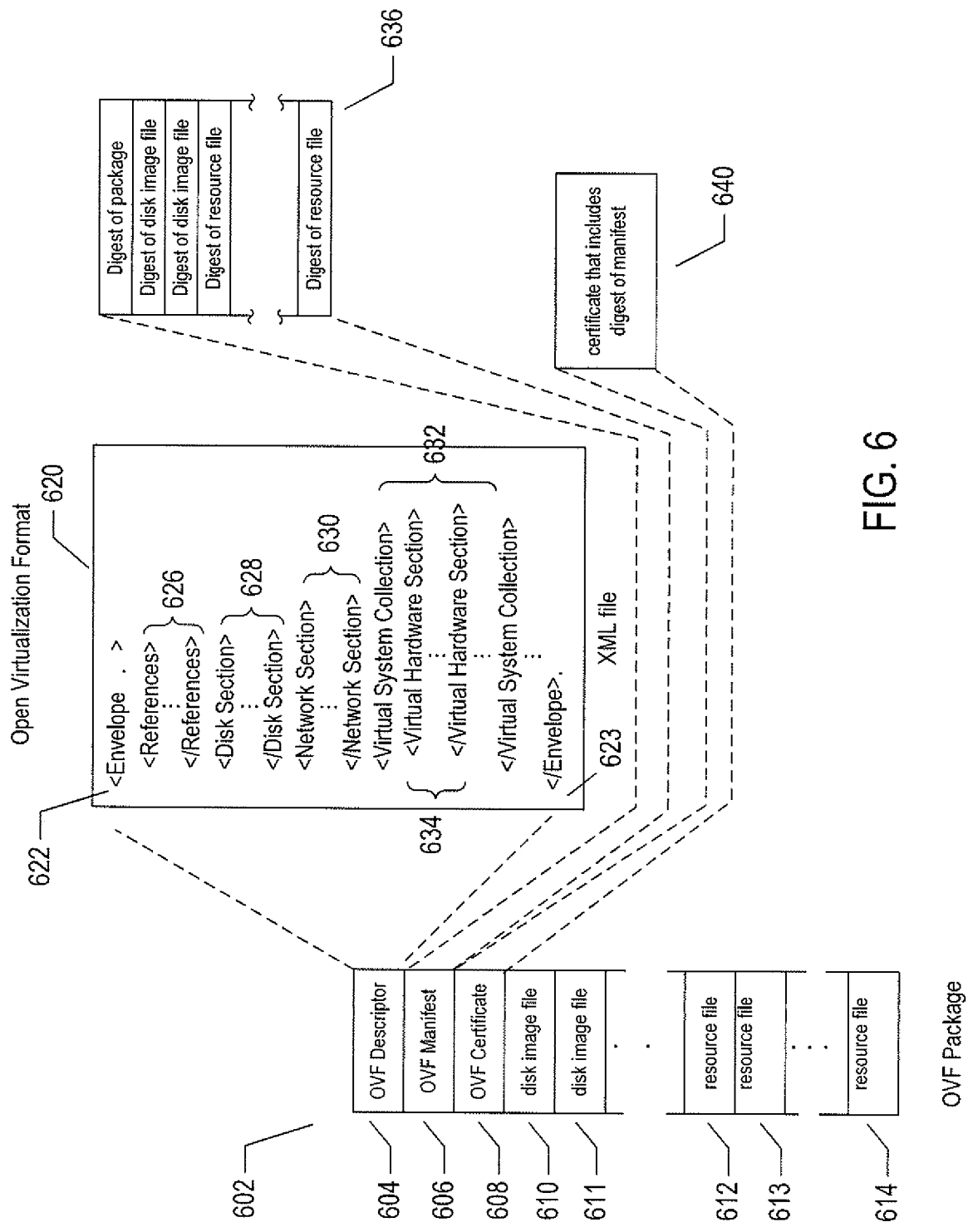
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
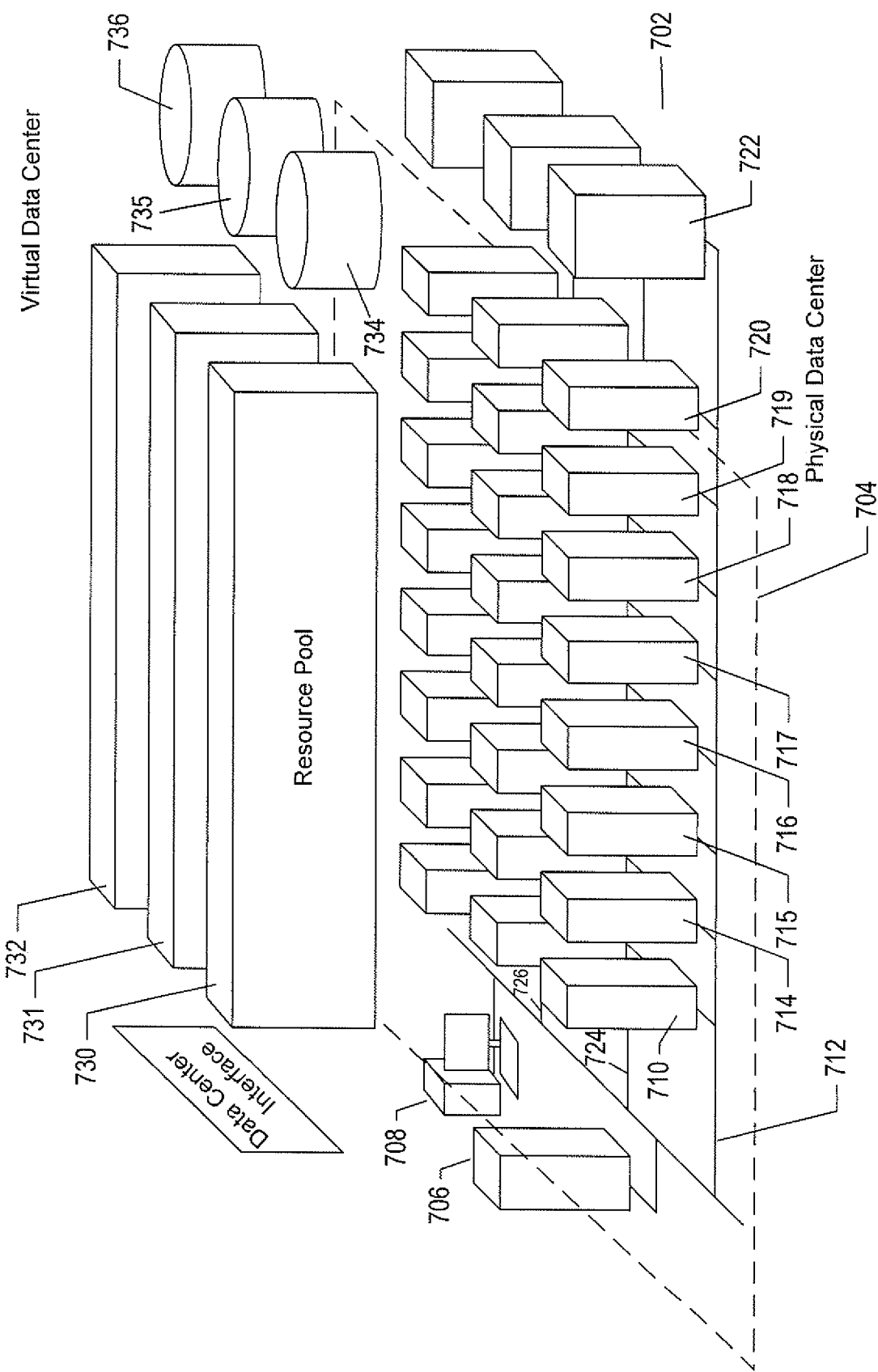
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
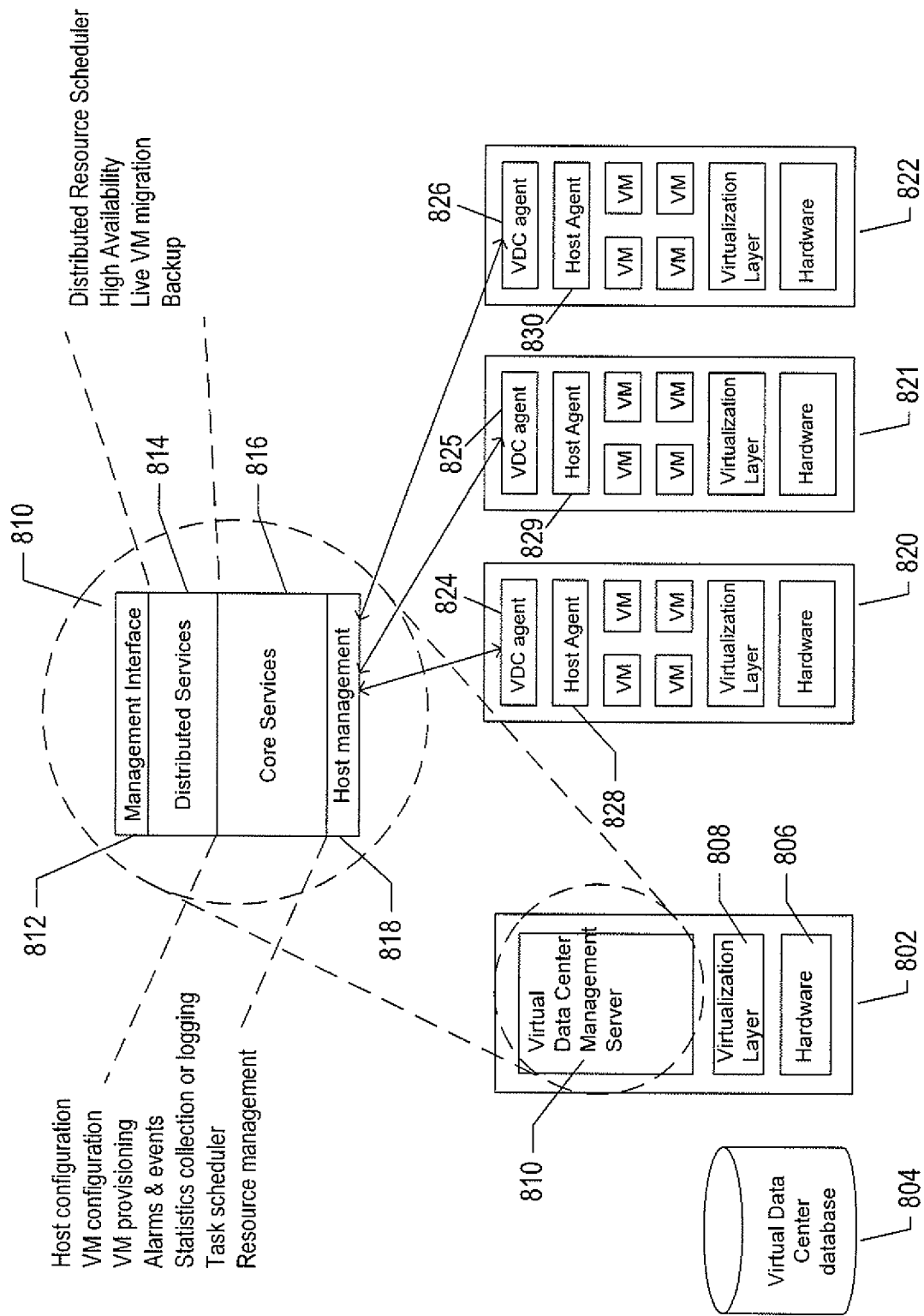
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
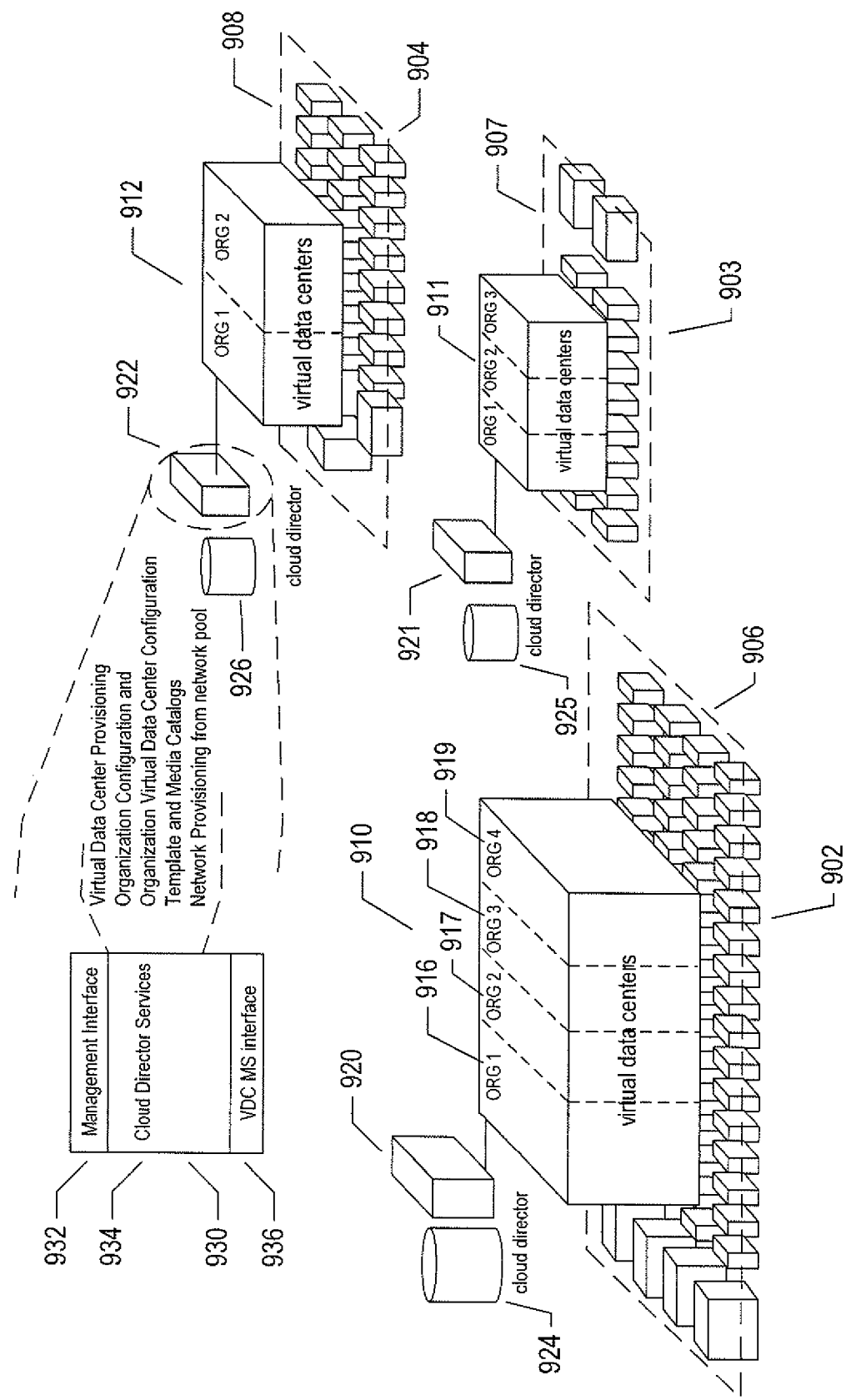
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
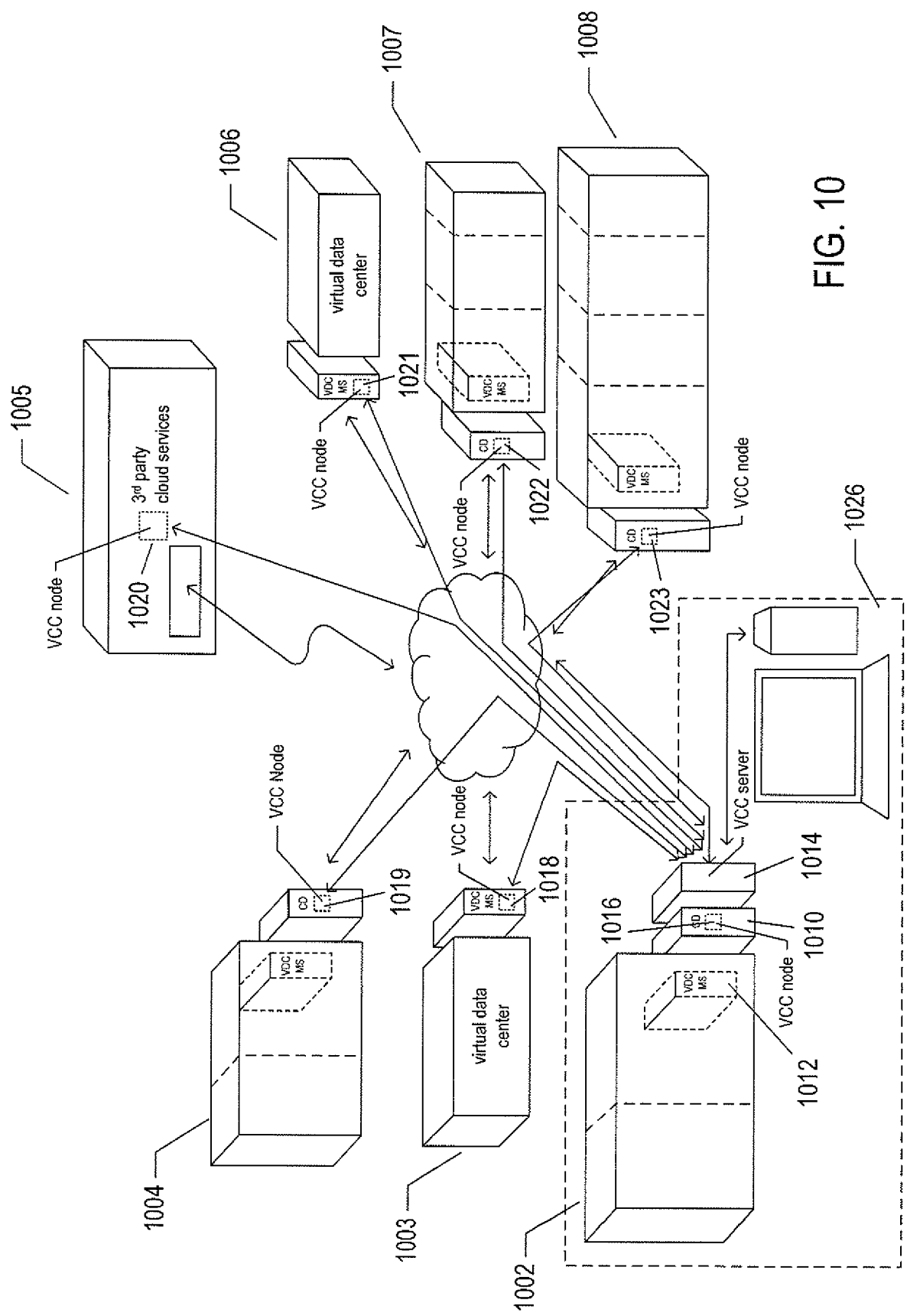
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11A:
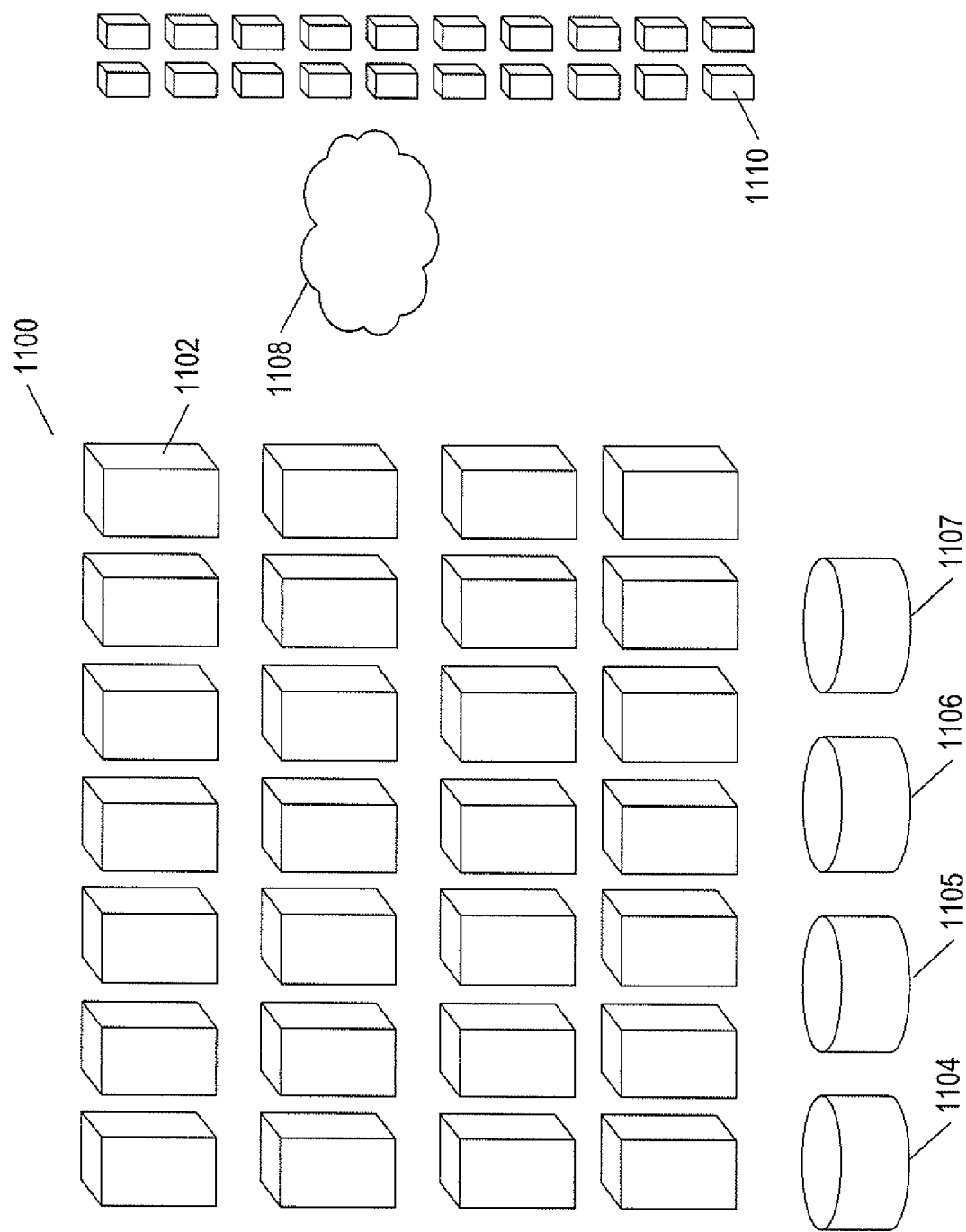
FIG. 11A-E shows a workflow-based cloud-management facility that has been developed to provide a powerful administrative and development interface to multiple multi-tenant cloud-computing facilities.

Currently Disclosed Methods and Systems that Carry Out Live Migration of Multi-Node Applications FIGS. 11A-E illustrate various aspects of the problem domain associated with live migration of multi-node applications. In FIG. 11A, a cloud-computing facility 1100 is abstractly represented by a large number of servers, including server 1102, and a number of mass-storage appliances 1104-1107. Various of the servers within the cloud-computing facility are connected by local and wide-area networks 1108 to a number of remote computer systems, including remote computer system 1110. Of course, a cloud-computing facility includes much additional hardware, as discussed in the preceding subsection, and the remote computer systems may include a wide variety of computers, from handheld smart phones and laptops to computer systems within large distributed computing systems.

Figure 11B:
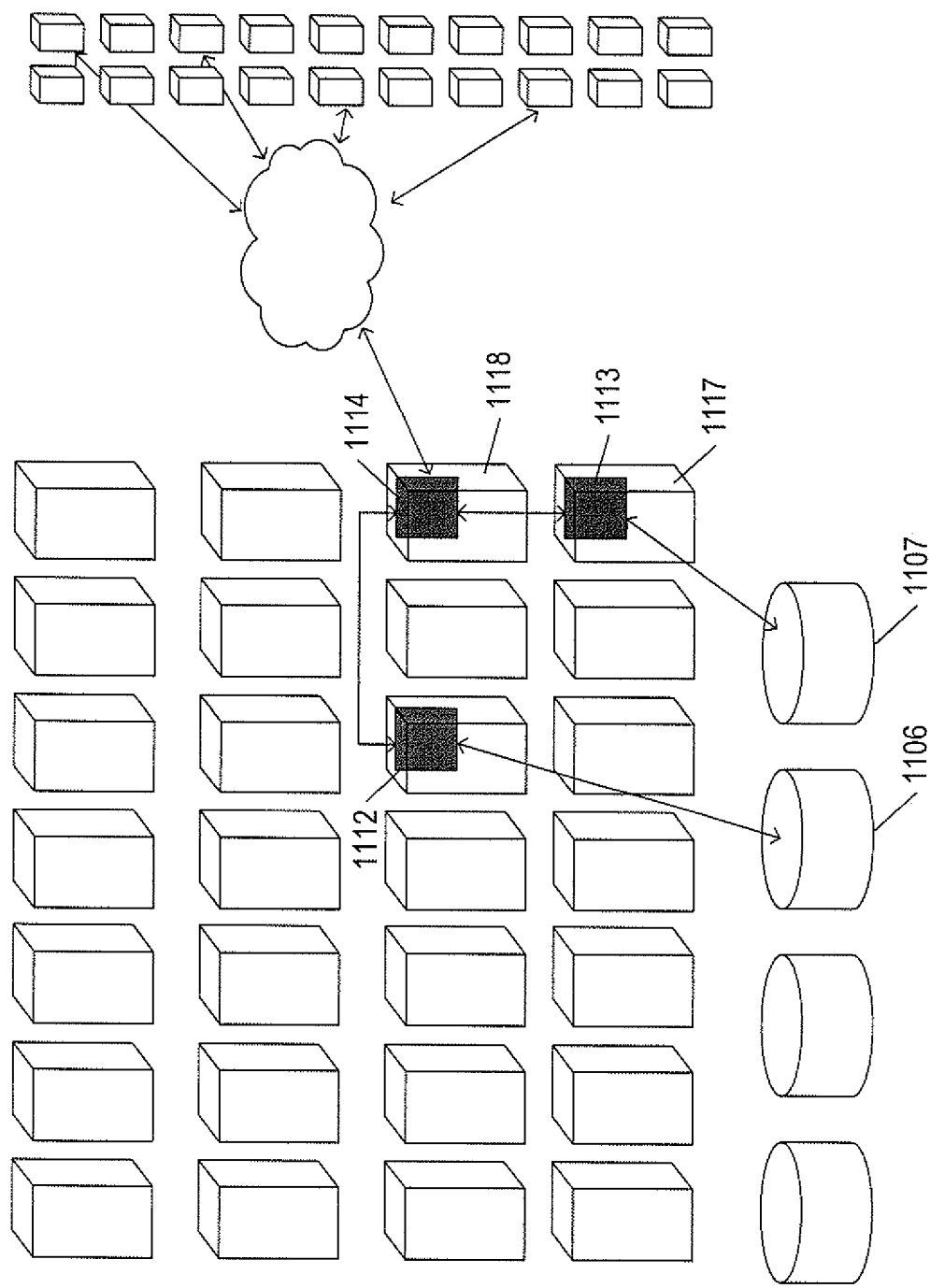

FIG. 11B illustrates a multi-node application running within the cloud-computing facility. An application node is an instance of a multi-node application executing within a server or other computer system. Multiple application nodes may execute within a single server, in certain implementations, although, in the example of FIGS. 11A-E, each instance of the multi-node application executes in a different server. The multi-node application includes 3 instances of the application 1112-1114 within 3 different servers 1116-1118. There are many different types of multi-node applications that run within cloud-computing facilities. In the current case, the multi-node application may be a high-availability e-commerce application. Application instance 1114 may be the primary web server for the e-commerce application that receives requests from remote computers via the local and wide-area networks, distributes received requests to application instances 1112-1113, receives responses from the application instances 1112-1113, and then packages the responses into webpages served to the remote computer systems. Application instances 1112-1113 access data stored in mass-storage appliances 1106 and 1107 in order to carry out requested services on behalf of the remote computer systems. In the event that application instance 1114 were to fail, or the server 1118 were to experience a failure or exhibit degraded operational states, one of application instances 1112-1113 would immediately assume primary-web-server responsibilities so that the e-commerce site would continue to receive and respond to requests from the remote computers.

Figure 11C:
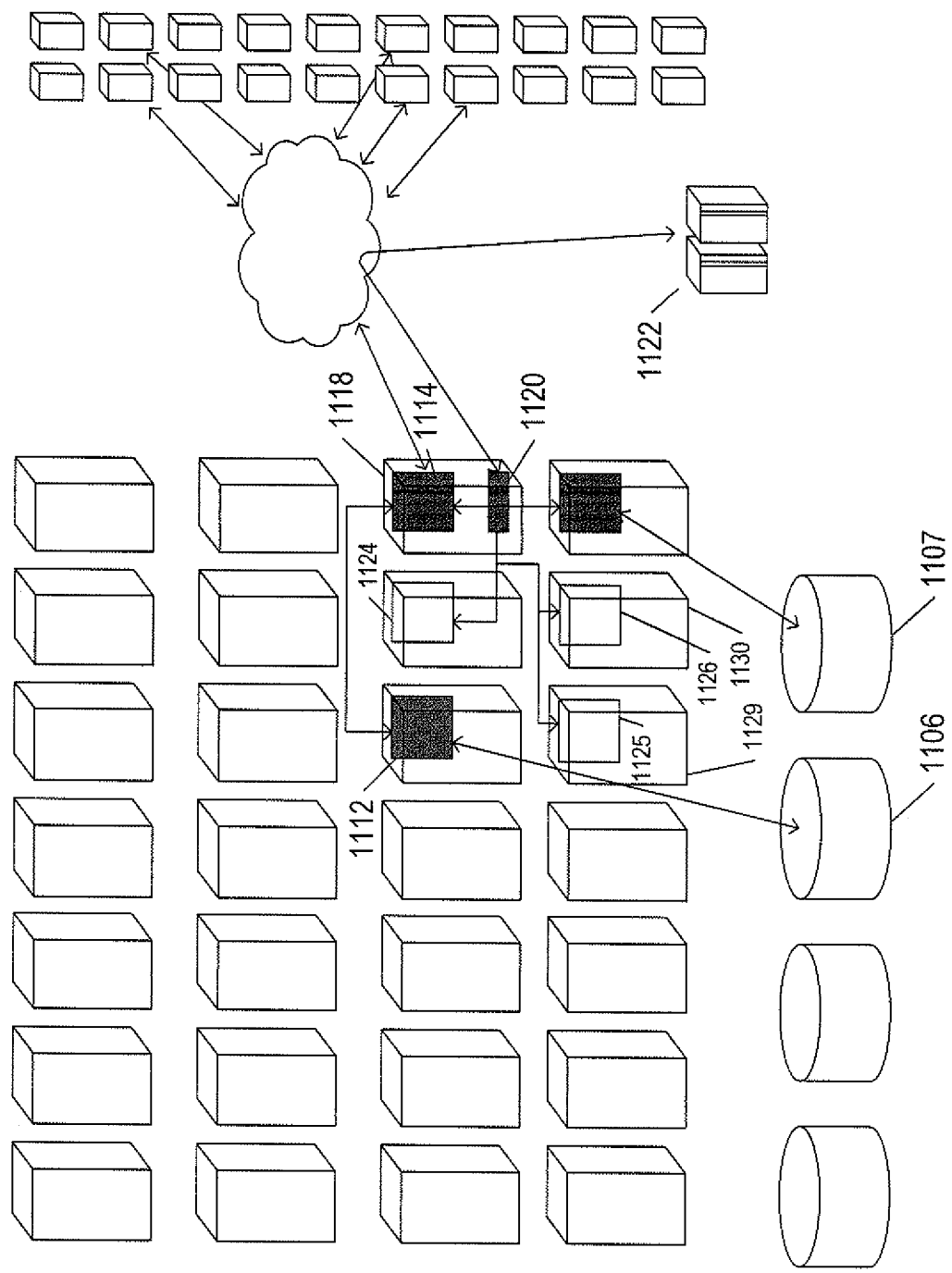
Figure 11D:
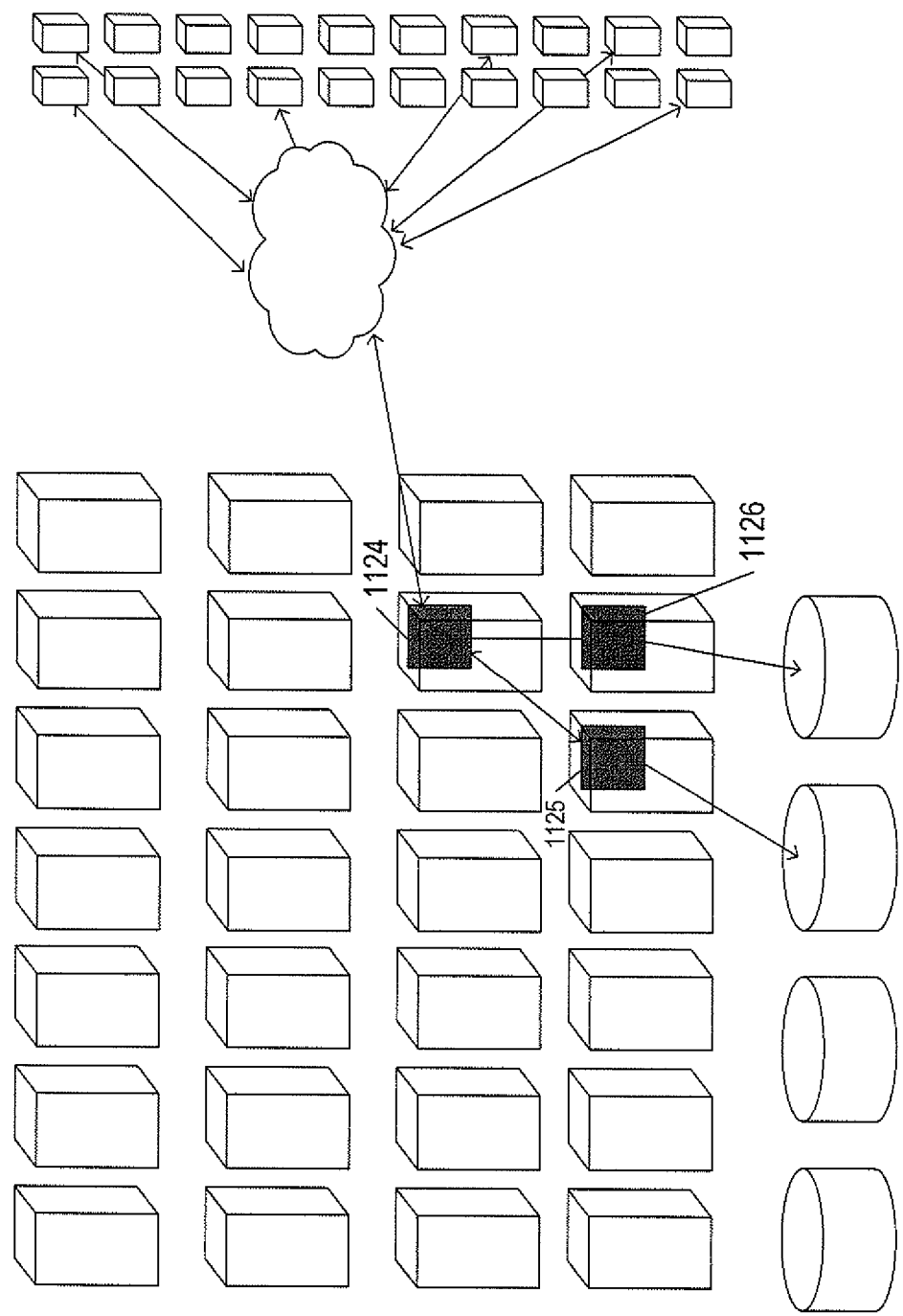

FIG. 11C illustrates a version-update migration of the multi-node application within the distributed computing system. The version-update process downloads and launches a new version of the multi-node application to run in place of the currently executing version of the multi-node application. An installer/agent 1120 is downloaded from an application-distribution system 1122 and installed in one of the servers 1118 of the cloud-computing facility. In the example shown in FIG. 11C, the installer/agent is installed within the same server computer that runs application instance 1114, but the installer/agent may be downloaded to, and installed within, a server within the cloud-computing facility that is not hosting an instance of the multi-node application. The applications/installer collects information about the version update that the installer has been downloaded to carry out, downloads a new version of the multi-node application to the cloud-computing facility, and installs new instances of the new version of the multi-node application 1124-1126 into server computers 1128-1130. As shown in FIG. 11D, once the installation procedure has been carried out, the previously executing application instances 1112-1114 terminate and the new-version application instances 1124-1126 continue receiving and responding to requests for services from the remote computer systems.

Figure 11E:
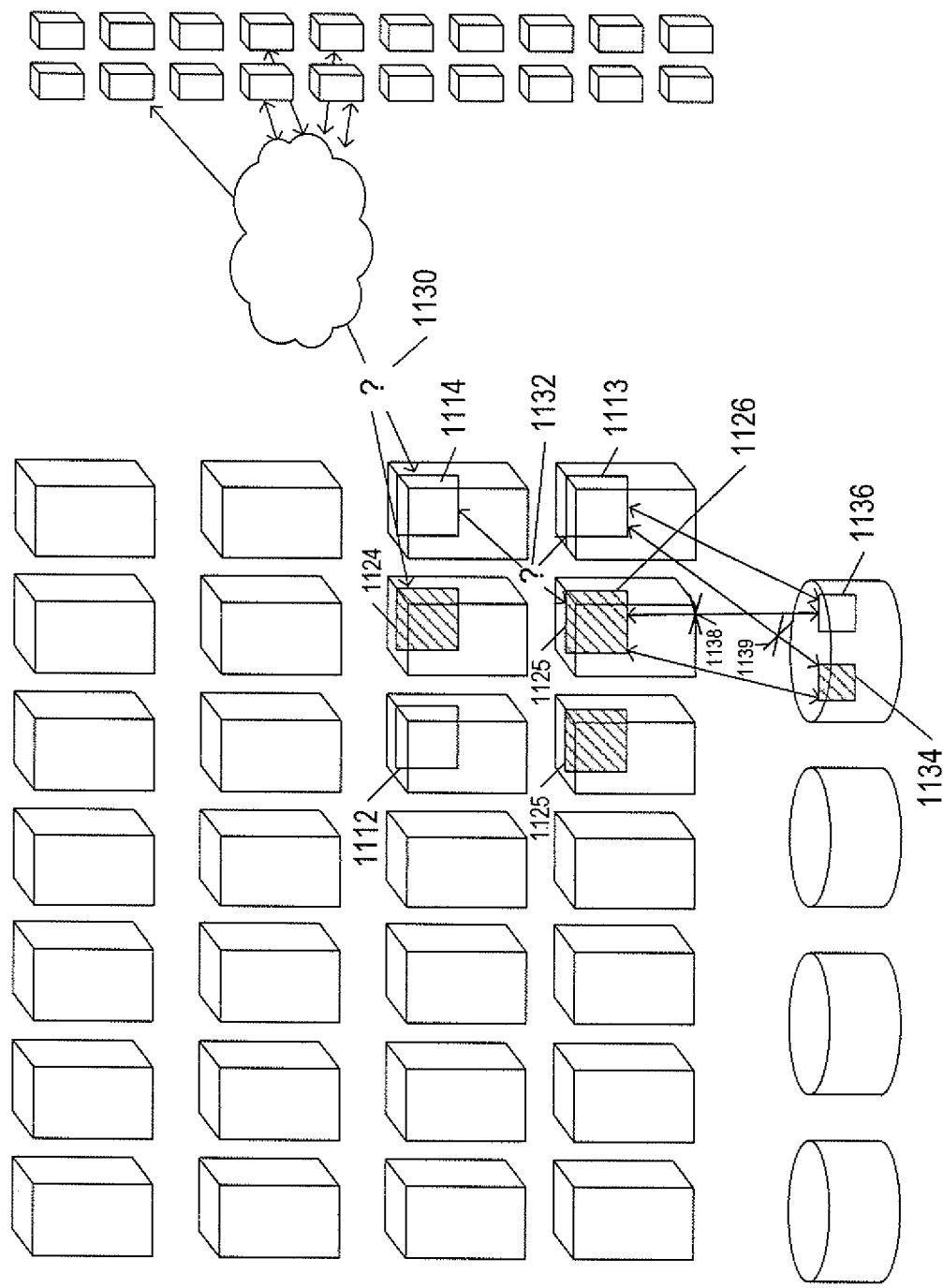

FIG. 11E illustrates certain of the problems associated with live migration of a multi-node application from an older version to a new version, as discussed above with reference to FIGS. 11C-D. In FIG. 11A, the older-version application instances 1112-1114 are shown as unshaded rectangles while the new-version application instances 1124-1126 are shown as crosshatched rectangles. During the migration process, the older-version application instances may continue to execute while the new-version application instances are launched and begin to execute. During this period, it may be unclear, as represented by the "?" symbol 1130, whether newly received requests should continue to be forwarded to the older-version application instance 1114 or to a new-version application instance 1124 that is intended to replace the older-version application instance 1114. Moreover, assuming that application instance 1114 receives the new request, it may be unclear, as represented by the "?" symbol 1132, whether execution of the request should be distributed to older-version application instance 1113 or to new-version application instance 1125, which will eventually replace older-version application instance 1113. Furthermore, it is often the case that the underlying data model for stored data used by the application instances may change as a result of a version update. The new-version application instance 1125 may expect to access stored data that adheres to a new-version data model 1134 while the older-version application instance 1113 expects to access stored data that adheres to an older-version data model 1136. As indicated by crosses 1138 and 1139, the new-version application instance 1125 may not be able to access and use stored data 1136 that adheres to the older-version data model and the older-version application instance 1113 may not be able to access and use stored data 1134 that adheres to the new-version data model. It is therefore unclear how, during the migration process, the differing stored-data models are reconciled to allow for the new-version application, instances to continue processing requests within the request-processing context that is, in part, represented by older-version stored data. Furthermore, the fate of a request received by an older-version application instance that has not completed when a new-version application instance replaces the older-version application instance may be unclear. There are myriad potential race conditions, data inconsistencies, execution-sequence discrepancies, and other distributed-computing problems that may arise when two different versions of a multi-node application concurrently execute within a cloud-computing facility.

Figure 12A:
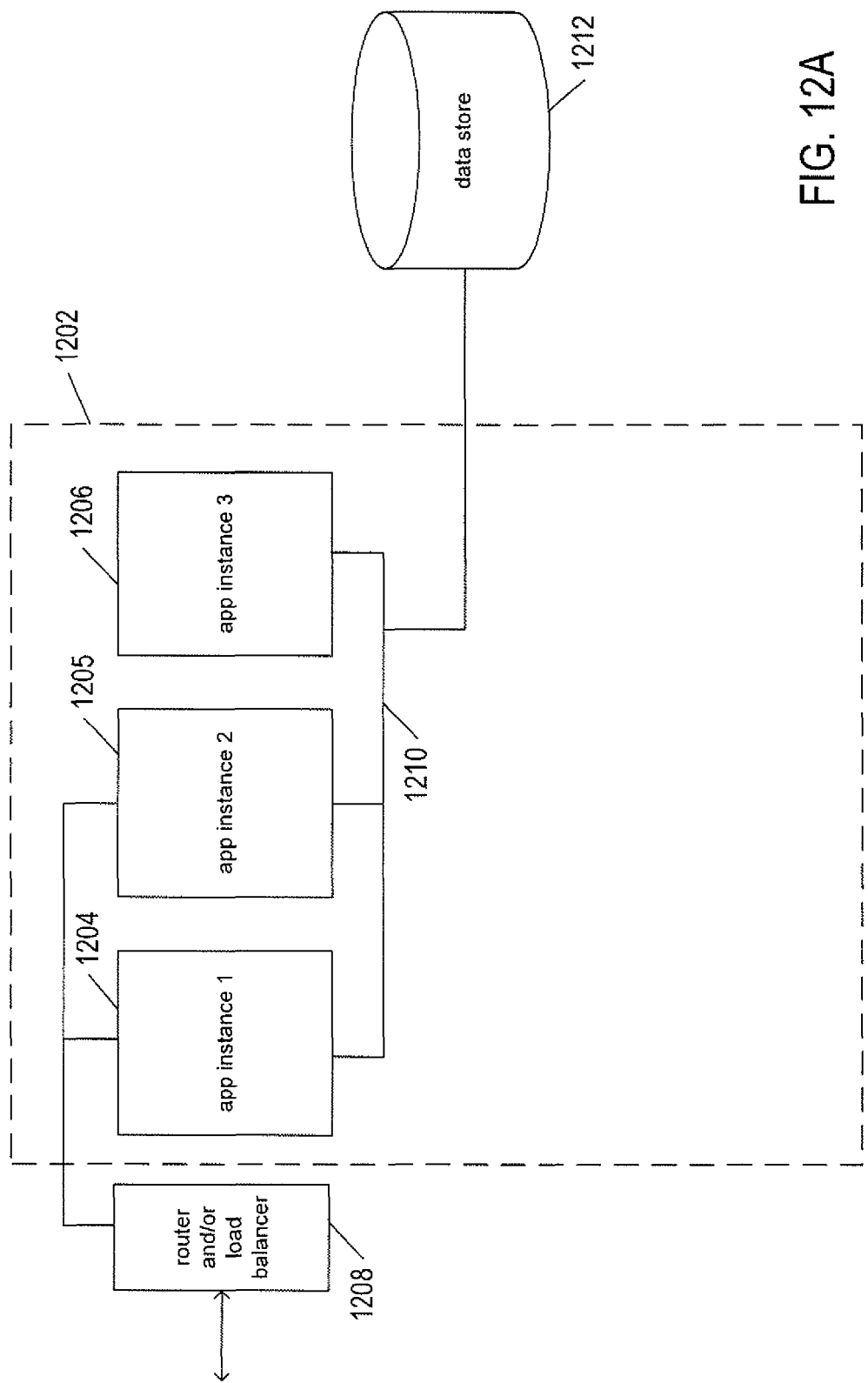

FIGS. 12A-G illustrate one implementation of the currently disclosed methods and systems for live migration of a multi-node application. FIG. 12A illustrates an example application-instance-execution environment within a cloud-computing facility. The dashed-lined rectangle 1202 represents one or more servers or other computer systems within a cloud-computing facility which support execution of multiple instances of a multi-node application. Rectangles 1204-1206 represent three multi-node application instances, or application nodes, of a currently executing, older version of a multi-node application. A router and/or load-balancer component 1208 within the cloud-computing facility forwards requests from external computer systems through one or more local-area networks to application instances 1204 and 1205. All three application instances 1204-1206 communicate with one another and with additional computational resources through a physical or virtual local-area network 1210, including with a data store 1212 accessible to the application instances.

Figure 12B:
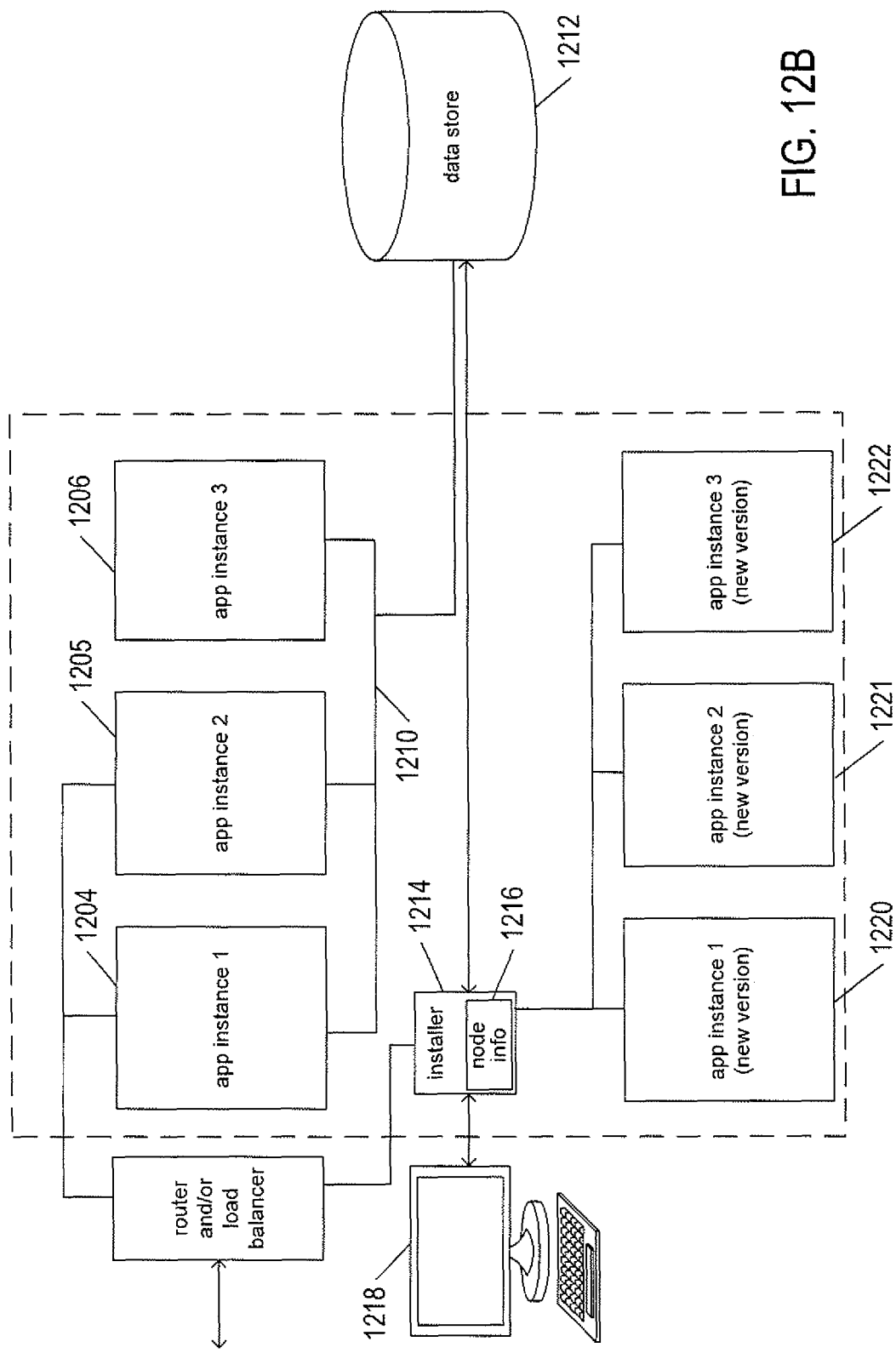

FIG. 12B illustrates a first stage in a live migration of the current version of the multi-node application to a new version of the multi-node application. First, an installer/agent 1214 is downloaded from an application-distribution server to the cloud-computing facility. Once launched, the installer/agent collects information 1216 regarding the currently executing application instances, including their network addresses, configurations, and other such information, as well as details about the desired migration to the new version of the multi-node application, including locations and addresses for new instances of the new-version multi-node application. This information may be, in whole or part, obtained through a user-interface dialogue 1218 with a system administrator or other privileged user of the cloud-computing facility and/or from a configuration file or other information, stored in the data store 1212, that was downloaded to the data store from the application-distribution remote system or that was accumulated during operation of the current application instances. Using the collected information 1216, the installer/agent downloads and installs the specified new-version application instances 1220-1222. Note that the number of application instances, or application nodes, may increase or decrease relative to the number of currently executing application nodes for certain installations and version updates, although, in the example shown in FIG. 12B, the number of new-version application nodes is equal to the number of currently executing application nodes.

Figure 12C:
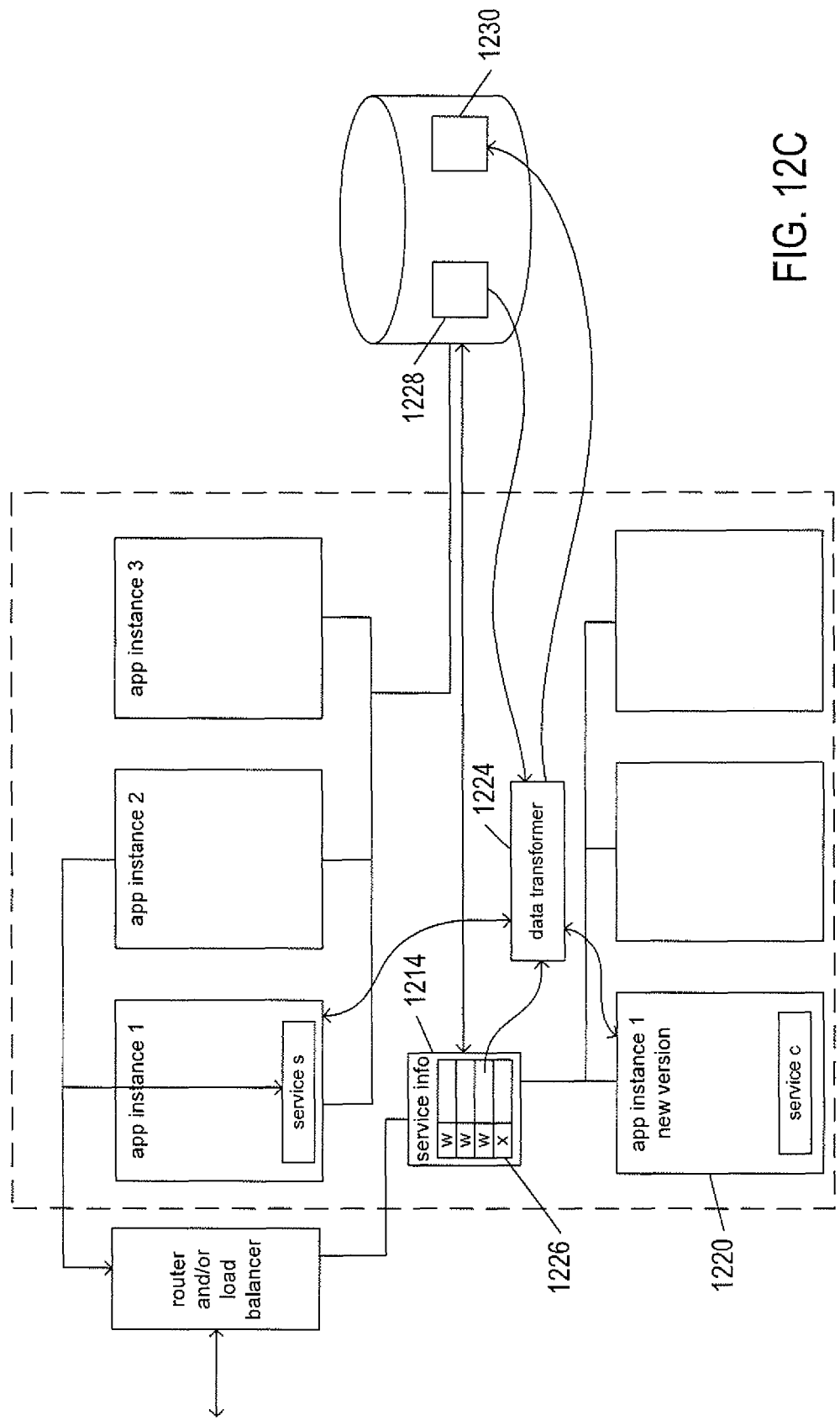

FIG. 12C illustrates a second stage in the live migration of the current version of the multi-node application to a new version of the multi-node application. The installer/agent 1214 downloads or retrieves a data transformer 1224 that runs within the context of the installer/agent, in one implementation. The data transformer transforms older-version stored data to new-version stored data and may also transform in-memory older-version data to in-memory new-version data for in-memory data associated with multi-node application instances. The installer/agent 14 invokes a discovery service that allows the installer/agent to determine the services currently offered by the currently executing multi-node application as well as the services provided by the new-version multi-node application. For those services offered by both the older-version multi-node application and the new-version multi-node application, the installer/agent generates a services list 1226 with entries that include descriptions of the services as well as a status. Initially, services in the services list are associated with an initial status "X." As each service is warm started, the status associated with the service is changed to "W," in the implementation illustrated in FIG. 12C. During a warm start, the installer/agent uses the data transformer 1224 to transform older-version stored data for the service 1228 to corresponding new-version stored data 1230. The installer/agent also carries out an initial configuration of the service in the new application instance 1220 that supports the service. Of course, these steps may be carried out for multiple instances of a particular service that will be supported by multiple new-version application instances. Once the new service in the new application instances has been fully provisioned with needed stored data and in-memory data by applying the data transformer to corresponding older-version stored data and in-memory data associated with the service in the older-version application instance or instances, the status of service is set to "W." However, the new service remains dormant, for the time being, and does not initially receive requests or carry out or facilitate execution of requests.

Figure 12D:
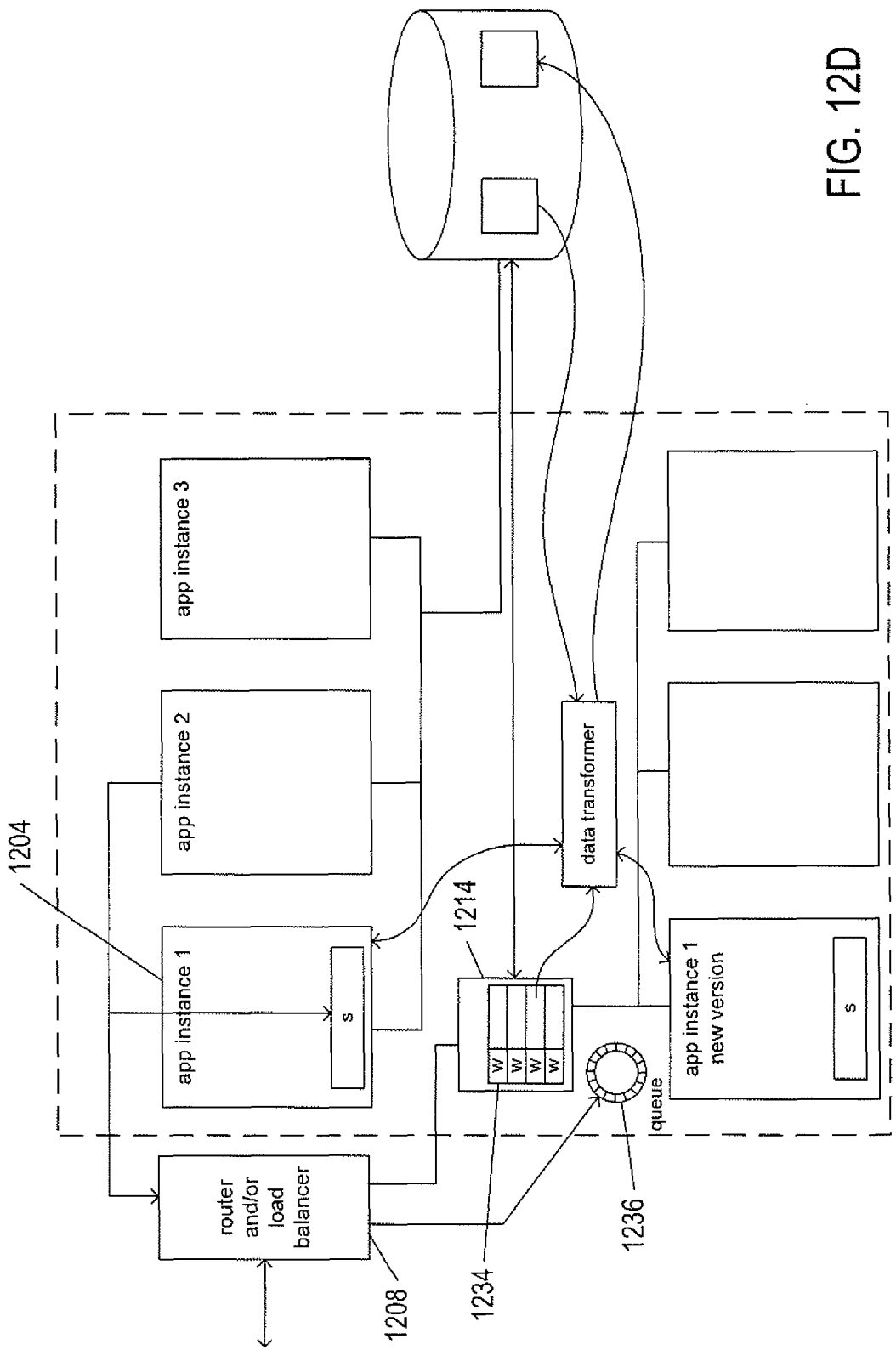
Figure 12E:
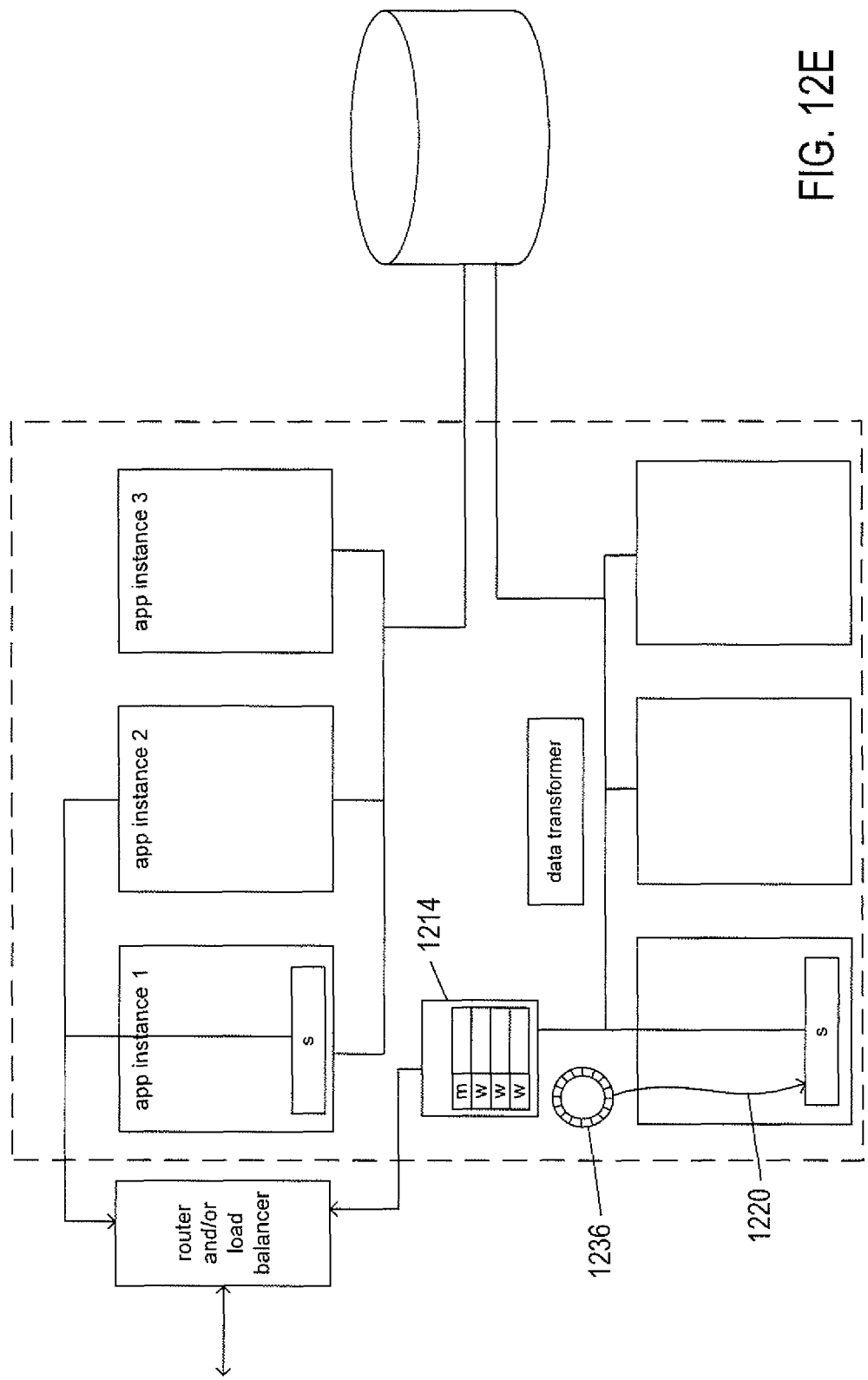
Figure 12F:
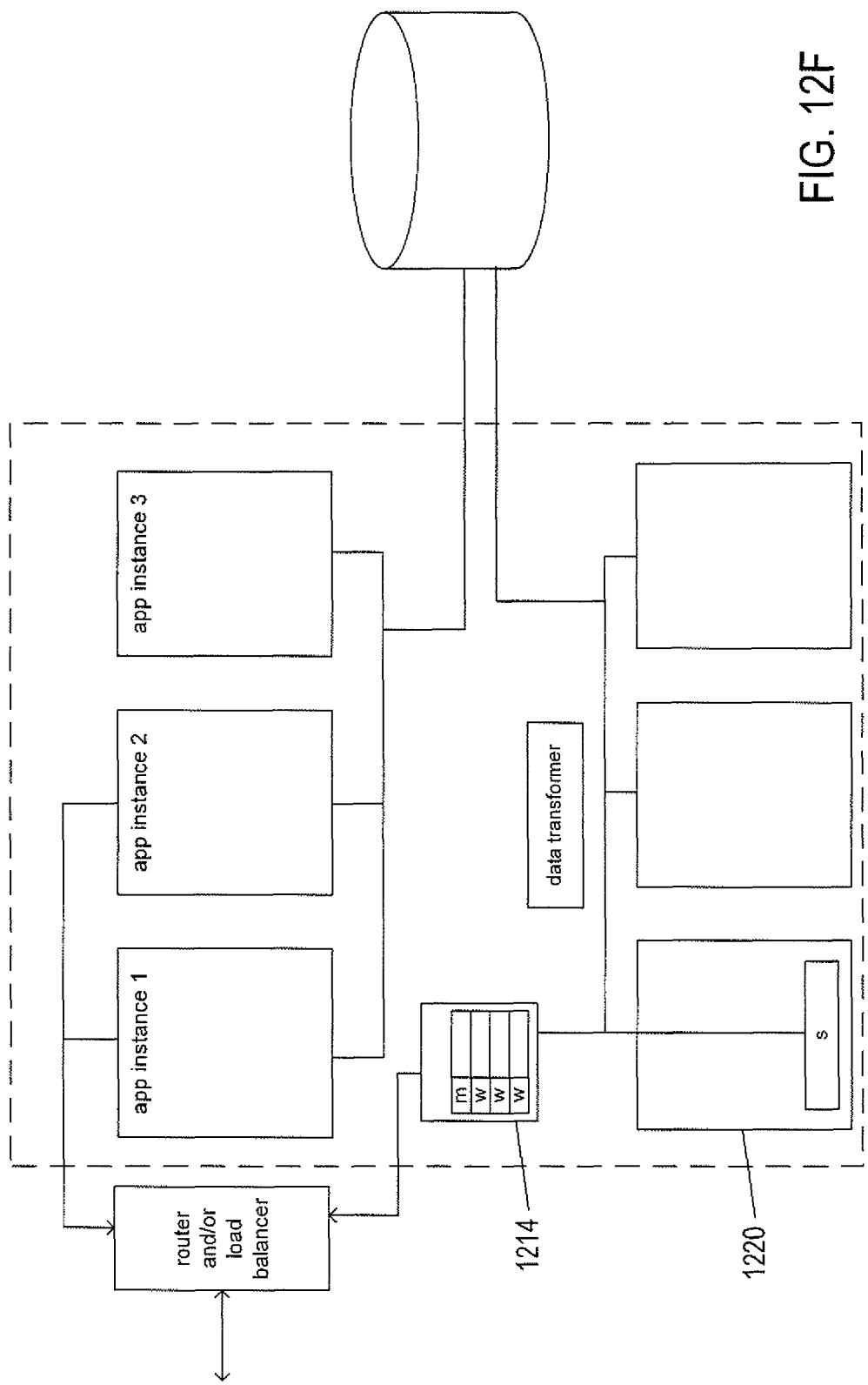

FIG. 12D illustrates a third stage in the live migration of the current version of the multi-node application to a new version of the multi-node application. Once the various services in the services list have been warm started, the installer/agent 1214 again traverses the services list to deploy each service. During deployment of a service, such as the service represented by the first entry in the services list 1234, the installer/agent updates the router and/or load balancer 1208 to begin directing newly received service requests for the service to a temporary queue 1236. Any pending service requests previously received by the older-version application instance 1204 continue to be processed by the older-version application instance 1204, with responses returned by the older-version application instance to the remote service-requesting computers. Concurrently, the installer/agent carries out a rapid data sync to ensure that the new-version application instance has full, up-to-date stored data and in-memory data that represents a request-processing context for the service. When the service is distributed across multiple new-version nodes, a full quorum of the nodes is required for writes to the new-version data. Similarly, when the service is distributed across multiple older-version nodes, reads of the older-version data requires a ⅔ quorum from the older version nodes. As shown in FIG. 12E, once the data sync is completed, the installer/agent 1214 updates the router and/or load balancer to allow the new-version application instance 1220 to forward responses to remote requester systems. In addition, any newly received service requests in the temporary queue 1236 are input to the now up-and-running service. Finally, as shown in FIG. 12F, the installer/agent 1214 updates the router and/or load balancer to allow for connection of the new-version application instance to remote computer systems to allow the new-version service to fully replace the older-version service. The router and/or load balancer is additionally updated to completely disconnect the older-version service once the older-version service has finished processing previously received requests.

FIG. 12G illustrates the final result of the live migration. Once the installer/agent has completed deployment of the services in the services list, the older-version application instances are terminated, leaving a fully functional set of new-version application instances 1220-1222. The installer/agent 1214 may continue to operate in order to carry out additional tasks, including updating the router and/or load balancer 1208 to connect any new-version services that were not previously offered by the older-version multi-node application to the wide-area network and to coordinate any additional data transformations needed by the new-version multi-node application.

Figure 13:
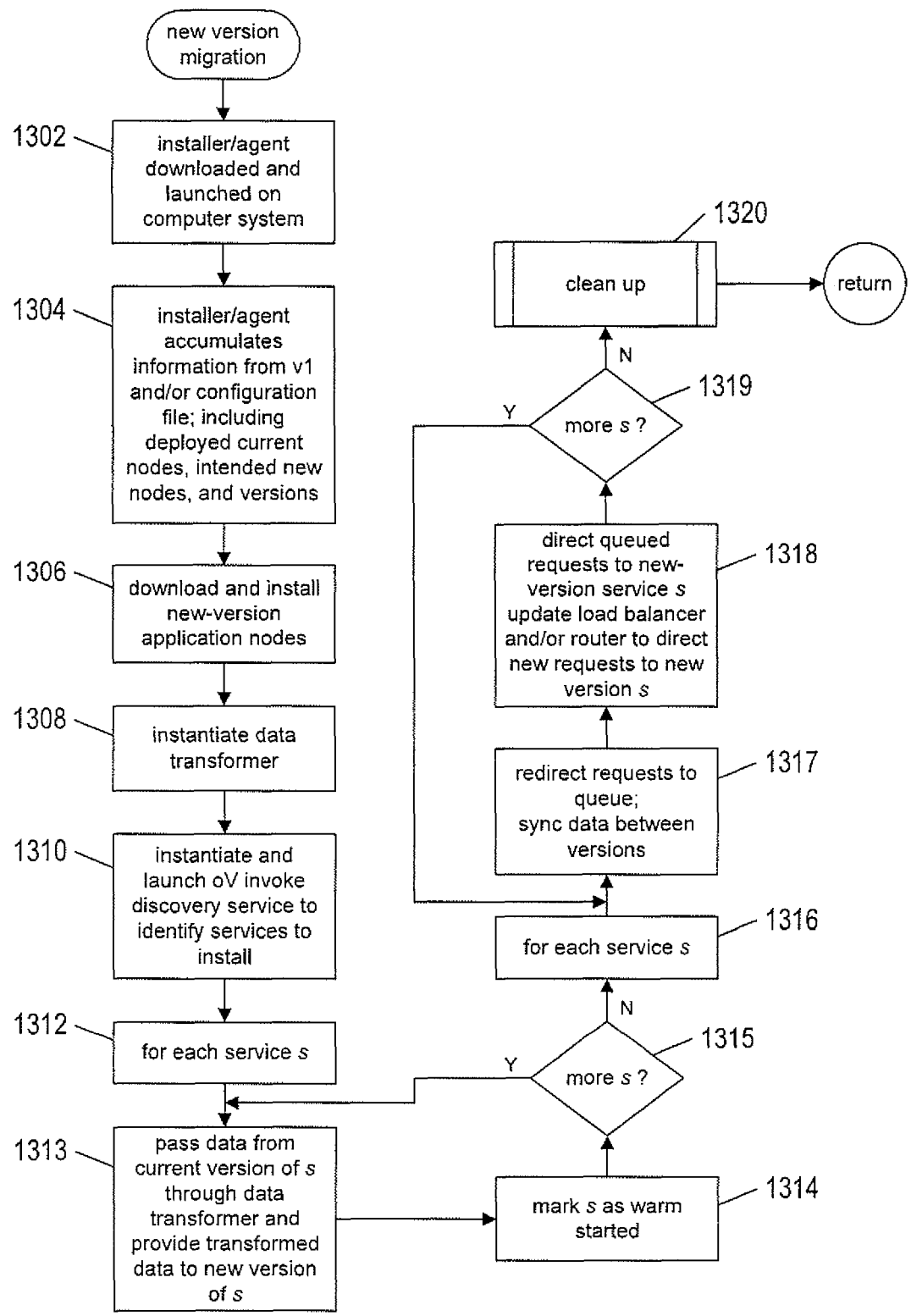
FIG. 13 illustrate the structure of a workflow.

FIG. 13 provides a control-flow diagram for the version-update migration, illustrated in FIGS. 12A-G and discussed above. In step 1302, the installer/agent is downloaded from an application-distribution system and launched within a cloud-computing facility. In step 1304, the installer/agent collects information about the current version of a multi-node application and a new version to be installed in the cloud-computing facility. The information may be obtained, through a user interface, from a system administrator or other privileged user of the cloud-computing facility, from a configuration file currently stored within the cloud-computing facility, from a configuration file downloaded from the application-distribution system, and from various types of information maintained by the currently executing multi-node application within the cloud-computing facility. In step 1306, the installer/agent downloads and installs new-version instances of the multi-node application within the cloud-computing facility, using the information collected in step 1304 to select computer systems within the cloud-computing facility in which to install the new-version instances of the multi-node application and to carry out initial configuration of the newly installed new-version application instances. In step 1308, the installer/agent instantiates a data transformer that transforms stored and in-memory old-version data to new-version stored and in-memory data. When necessary, the installer/agent downloads the data transformer from a remote application-distribution computer system. In step 1310, the installer/agent instantiates and launches a discovery service or invokes and already instantiated discovery service to identify services provided by the currently executing multi-node application and the new-version multi-node application. For each of those services provided by both the currently executing multi-node application and the new-version multi-node application, the installer/agent, in the for-loop of steps 1312-1315, uses the data transformer to transform older-version in-memory and stored data for the service to new-version in-memory and stored data for the service, so that the new-version application instantiations that implement the service have a data request-processing context for the service that they can access and use. In addition, in step 1314, the installer/agent marks the service as warm-started following generation of the data context for the service. In the for-loop of steps 1316-1319, for each of the services provided by both the older-version multi-node application and the new-version multi-node application, the installer/agent redirects requests to the service to a temporary queue and carries out a data sync between the two service versions to ensure that they share a common data context. In step 1318, the installer/agent then directs queued requests to the new-version service and updates the load balancer and/or router to direct new requests to the new-version service. Once all of the shared services have been fully deployed as new-version services in the for-loop of steps 1316-1319, the installer/agent carries out a clean-up process, represented by step 1320 in FIG. 13, in which the router and/or load balancer is updated to provide full access by remote computer systems to the new-version services and in which the router and/or load balancer is updated to terminate access by the older-version application instances to remote computers. In addition, the older-version multi-node application instances are terminated and uninstalled.

Although the present invention has been described in terms of particular embodiments, it is not intended that the invention be limited to these embodiments. Modifications within the spirit of the invention will be apparent to those skilled in the art. For example, any of many different implementations can be obtained by varying any of many well-known design and implementation parameters, including choice of virtualization layer, operating system, programming language, modular organization, data structures, control structures, and other such parameters. In alternative implementations, different sequences of operations and operations and phases may be employed, and the logic for the live migration may be implemented in, and distributed across, multiple agents and other executables.

The invention claimed is:

1. A live-migration method that migrates a multi-node application executing as multiple instances from a current version to a new version within a distributed computing system, the live-migration method comprising:

downloading an installer/agent in the distributed computing system;

determining, by the installer/agent, version-update information;

installing, by the installer/agent, multiple instances of the new version of the multi-node application within the distributed computing system;

identifying, by the installer/agent, services provided by the multi-node application;

warm starting, by the installer/agent, the multiple instances of the new version of the multi-node application, including generating, by the installer/agent, new-version data for the multiple instances of the new version of the multi-node application from current-version data;

deploying new versions of each of the identified services; and terminating and uninstalling the multiple instances of the current version of the multi-node application.

2. The live-migration method of claim 1 wherein the installer/agent is downloaded from an application-distribution system to a computer system within the distributed computing system.

3. The live-migration method of claim 1 wherein the installer/agent determines the version-update information by one or more of:

receiving the version-update information through a user interface from a privileged user of the distributed computing system;

accessing version-update information stored within the distributed computing system;

accessing one or more configuration files within the distributed computing system; and downloading one or more configuration files from an application-distribution system.

4. The live-migration method of claim 1 wherein the version-update information includes one or more of:

computer-system locations of current-version instances of the multi-node application;

network addresses of the current-version instances of the multi-node application;

version information related to the current-version multi-node application;

computer-system locations of new-version instances of the multi-node application;

network addresses of the new-version instances of the multi-node application; and version information related to the new-version multi-node application.

5. The live-migration method of claim 1 wherein the installer/agent identifies services provided by the multi-node application by invoking a service-discovery service within the distributed computing system.

6. The live-migration method of claim 1 wherein the installer/agent warm starts the multiple instances of the new version of the multi-node application by:

generating a list of services provided by both the current-version multi-node application and the new-version multi-node application;

for each service in the list of services, generating, by the installer/agent, new-version data for the service from current-version data associated with the service using a data transformer that transforms data formatted and organized according to a current-version data model to data formatted and organized according to a new-version data model, configuring, initializing, and launching the service, and marking a representation of the service in the list of services as warm-started.

7. The live-migration method of claim 1 wherein the installer/agent deploys the new versions of each of the identified services by:
for each service in the list of services,
updating a router and/or a load-balancing component within the distributed computing system to direct new requests for the service to a temporary queue rather than to the service;
carrying out a data sync operation to ensure that current-version data and new-version data for the service are consistent;
directing requests in the temporary queue to the service; and
updating the router and/or the load-balancing component within the distributed computing system to direct new requests for the service to the service and to receive responses from the service.

8. A cloud-computing facility that provides for live migration of a multi-node application executing as multiple instances from a current version to a new version, the cloud-computing facility comprising:
multiple server computers;
a router and/or a load-balancing component that forwards service requests from remote computers to one or more of the multiple server computers and transmits responses from the one or more of the multiple server computers to the remote computers;
multiple instances of a current version of a multi-node application executing within the cloud-computing facility; and
an installer/agent that automatically carries out a live migration of the current version of the multi-node application to a new version of the multi-node application.

9. The cloud-computing facility of claim 8 wherein the installer/agent:
determines version-update information;
installs multiple instances of the new version of the multi-node application within the cloud-computing facility;
identifies services provided by the multi-node application;
warm starts the multiple instances of the new version of the multi-node application, including generating, by the installer/agent, new-version data for the multiple instances of the new version of the multi-node application from current-version data;
deploys new versions of each of the identified services; and
terminates and uninstalls the multiple instances of the current version of the multi-node application.

10. The cloud-computing facility of claim 9 wherein the installer/agent determines the version-update information by one or more of:
receiving the version-update information through a user interface from a privileged user of the cloud-computing facility;
accessing version-update information stored within the cloud-computing facility;
accessing one or more configuration files within the cloud-computing facility; and
downloading one or more configuration files from an application-distribution system.

11. The cloud-computing facility of claim 9 wherein the version-update information includes one or more of:

computer-system locations of current-version instances of the multi-node application;
network addresses of the current-version instances of the multi-node application;
version information related to the current-version multi-node application;
computer-system locations of new-version instances of the multi-node application;
network addresses of the new-version instances of the multi-node application; and
version information related to the new-version multi-node application.

12. The cloud-computing facility of claim 9 wherein the installer/agent identifies services provided by the multi-node application by invoking a service-discovery service within the cloud-computing facility.

13. The cloud-computing facility of claim 9 wherein the installer/agent warm starts the multiple instances of the new version of the multi-node application by:
generating a list of services provided by both the current-version multi-node application and the new-version multi-node application;
for each service in the list of services,
generating, by the installer/agent, new-version data for the service from current-version data associated with the service using a data transformer that transforms data formatted and organized according to a current-version data model to data formatted and organized according to a new-version data model,
configuring, initializing, and launching the service, and marking a representation of the service in the list of services as warm-started.

14. The cloud-computing facility of claim 9 wherein the installer/agent deploys the new versions of each of the identified services by:
for each service in the list of services,
updating the router and/or the load-balancing component within the cloud-computing facility to direct new requests for the service to a temporary queue rather than to the service;
carrying out a data sync operation to ensure that current-version data and new-version data for the service are consistent;
directing requests in the temporary queue to the service; and
updating the router and/or the load-balancing component within the cloud-computing facility to direct new requests for the service to the service and to receive responses from the service.

15. A physical data-storage device that stores a sequence of computer instructions that, when executed by one or more processors within one or more of multiple server computers within a cloud-computing facility having a router and/or a load-balancing component that forwards service requests from remote computers to one or more of the multiple server computers and transmits responses from the one or more of the multiple server computers to the remote computers and multiple instances of a current version of a multi-node application executing within the cloud-computing facility, control the cloud-computing facility to:
determine version-update information;
install multiple instances of a new version of the multi-node application within the cloud-computing facility;
identify services provided by the multi-node application;
warm start the multiple instances of the new version of the multi-node application, including generating, by an installer/agent, new-version data for the multiple instances of the new version of the multi-node application from current-version data;
deploy new versions of each of the identified services; and
terminate and uninstall the multiple instances of the current version of the multi-node application.

16. The physical data-storage device of claim 15 wherein the version-update information is determined by one or more of:
    receiving the version-update information through a user interface from a privileged user of the cloud-computing facility;
    accessing version-update information stored within the cloud-computing facility;
    accessing one or more configuration files within the cloud-computing facility; and
    downloading one or more configuration files from an application-distribution system.

17. The physical data-storage device of claim 15 wherein the version-update information includes one or more of:
    computer-system locations of current-version instances of the multi-node application;
    network addresses of the current-version instances of the multi-node application;
    version information related to the current-version multi-node application;
    computer-system locations of new-version instances of the multi-node application;
    network addresses of the new-version instances of the multi-node application; and
    version information related to the new-version multi-node application.

18. The physical data-storage device of claim 15 wherein the multiple instances of the new version of the multi-node application are warm started by:
    generating a list of services provided by both the current-version multi-node application and the new-version multi-node application;
    for each service in the list of services,
        generating, by the installer/agent, new-version data for the service from current-version data associated with the service using a data transformer that transforms data formatted and organized according to a current-version data model to data formatted and organized according to a new-version data model,
        configuring, initializing, and launching the service, and
        marking a representation of the service in the list of services as warm-started.

19. The physical data-storage device of claim 15 wherein the new versions of each of the identified services are deployed by:
    for each service in the list of services,
        updating the router and/or the load-balancing component within the cloud-computing facility to direct new requests for the service to a temporary queue rather than to the service;
        carrying out a data sync operation to ensure that current-version data and new-version data for the service are consistent;
        directing requests in the temporary queue to the service; and
        updating the router and/or the load-balancing component within the cloud-computing facility to direct new requests for the service to the service and to receive responses from the service.

\* \* \* \* \*